Dec. 15, 1959 T. IAVELLI 2,916,934
POWER TRANSMISSION
Filed May 11, 1940 8 Sheets-Sheet 1
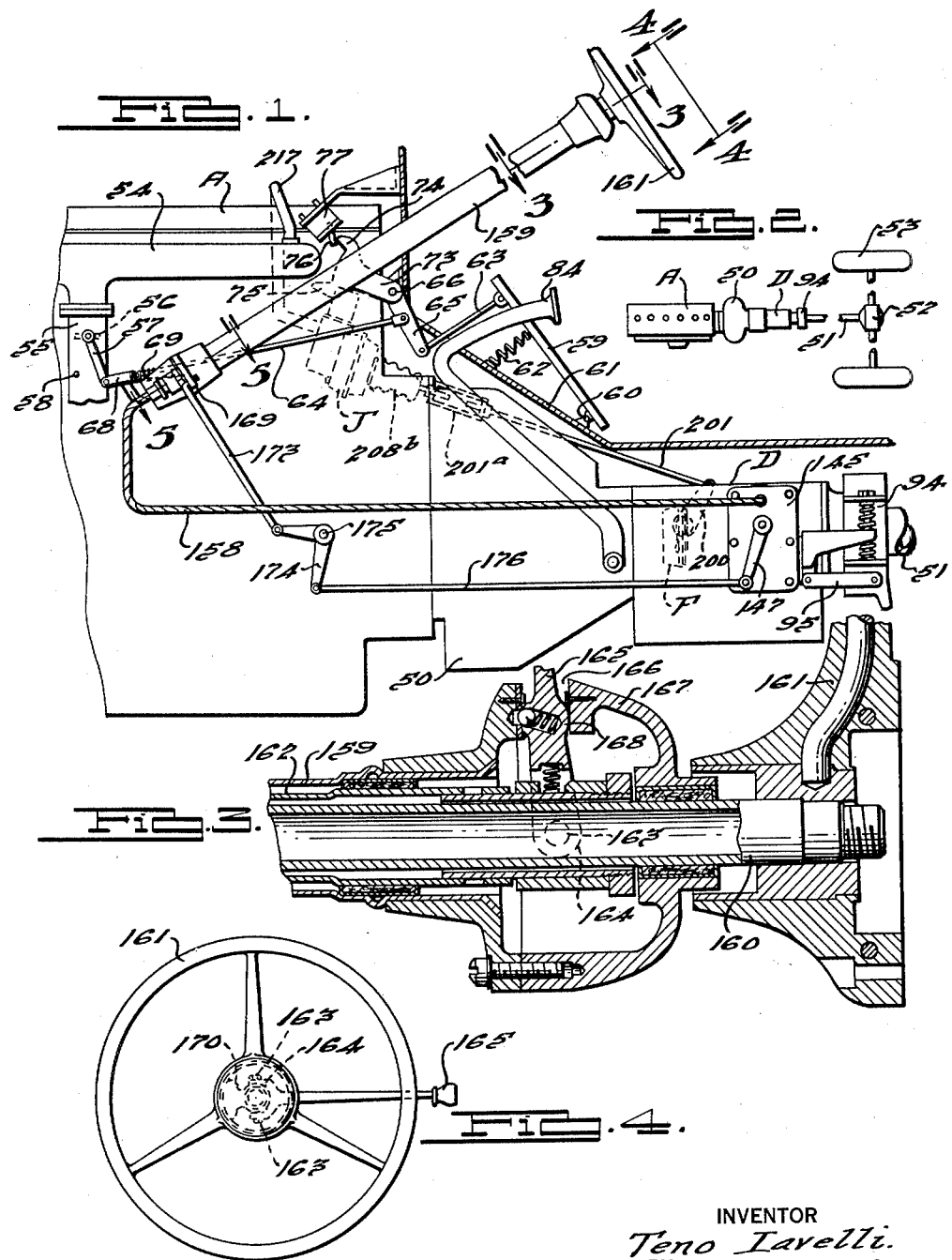
INVENTOR
Teno Iavelli.
BY
ATTORNEYS.

Dec. 15, 1959     T. IAVELLI     2,916,934
POWER TRANSMISSION
Filed May 11, 1940                              8 Sheets-Sheet 2
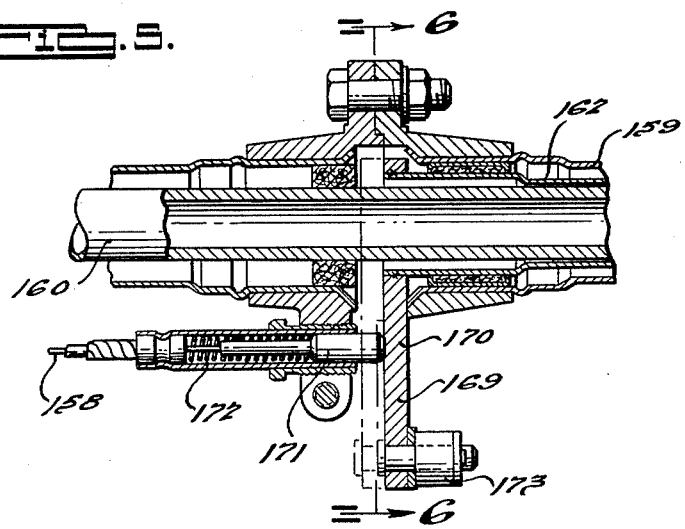
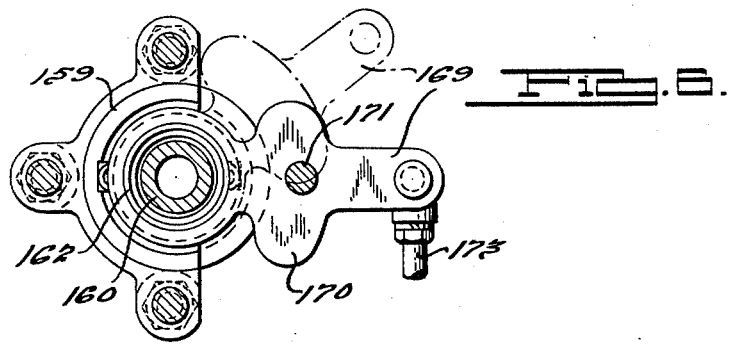
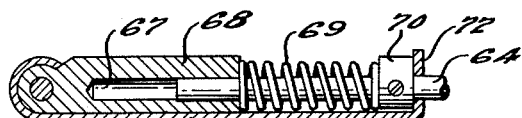
INVENTOR
Teno Iavelli.
BY
ATTORNEYS.

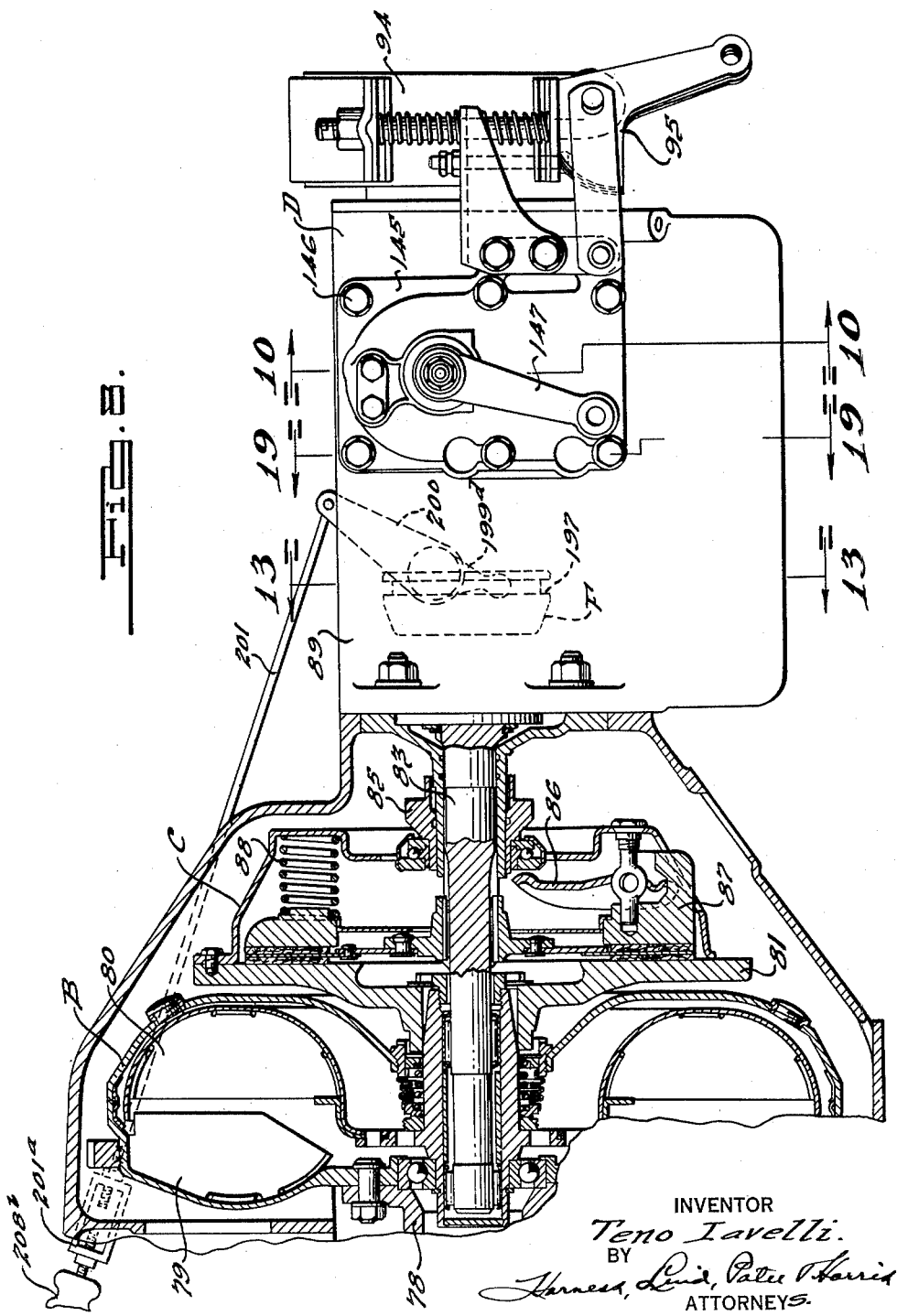

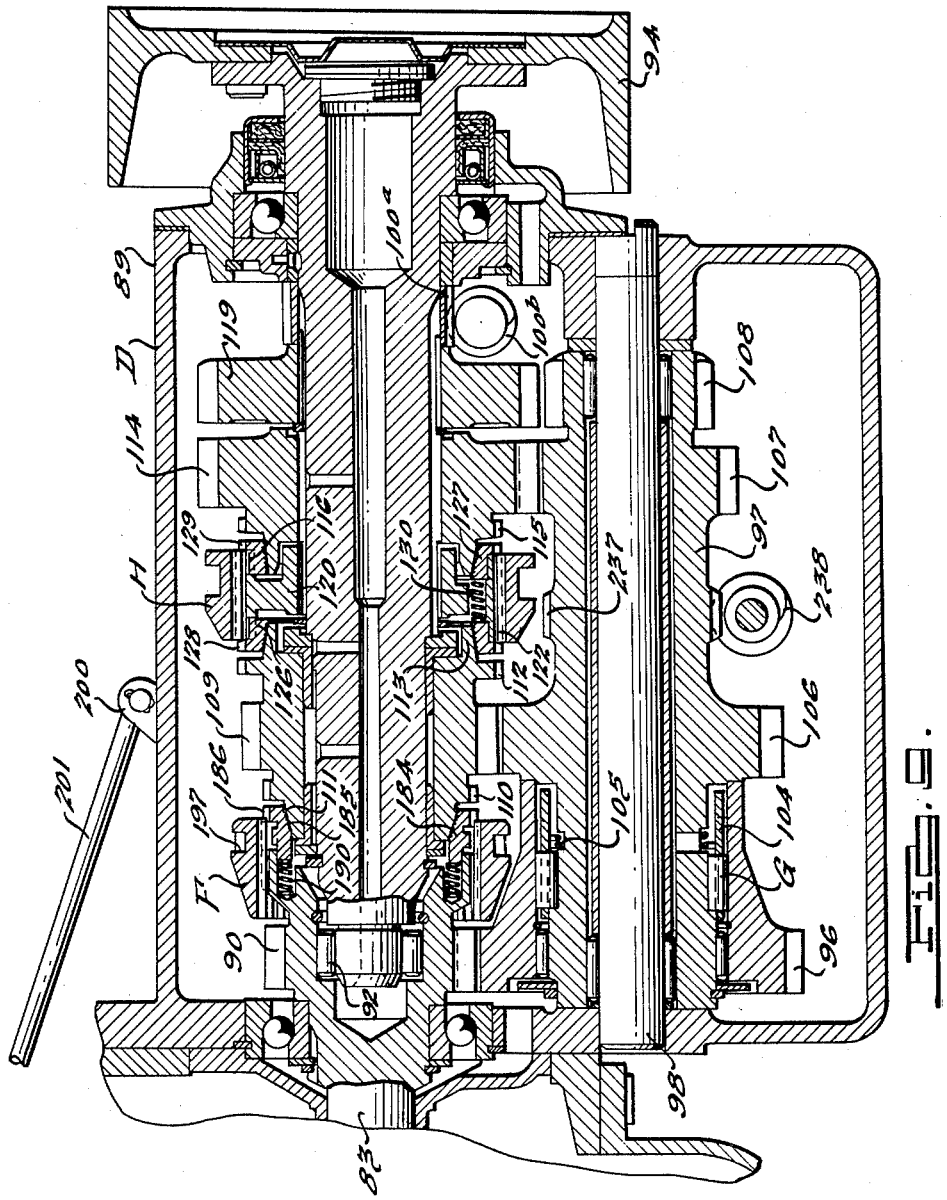

Dec. 15, 1959     T. IAVELLI     2,916,934
POWER TRANSMISSION
Filed May 11, 1940     8 Sheets-Sheet 5

INVENTOR
Teno Iavelli.

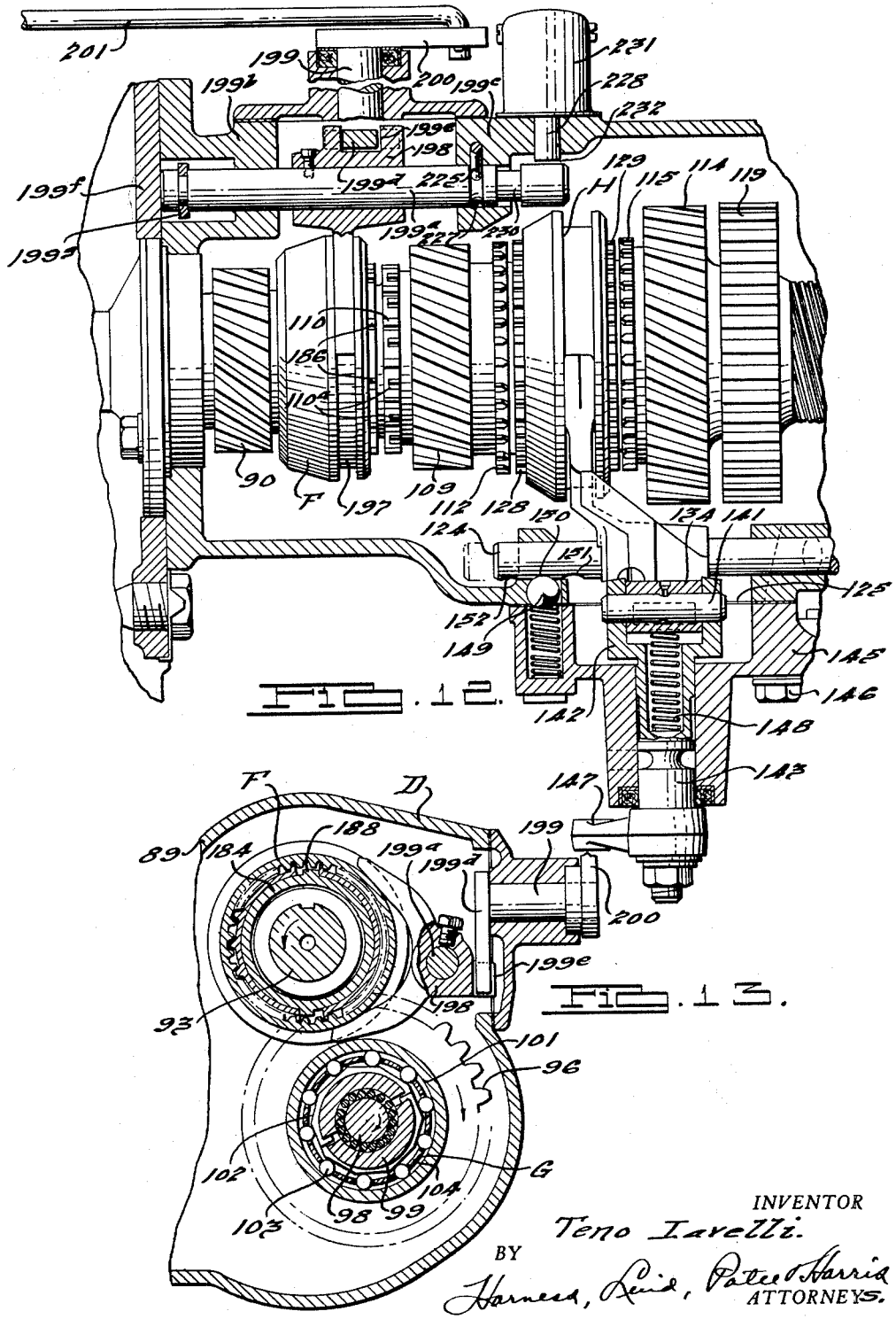

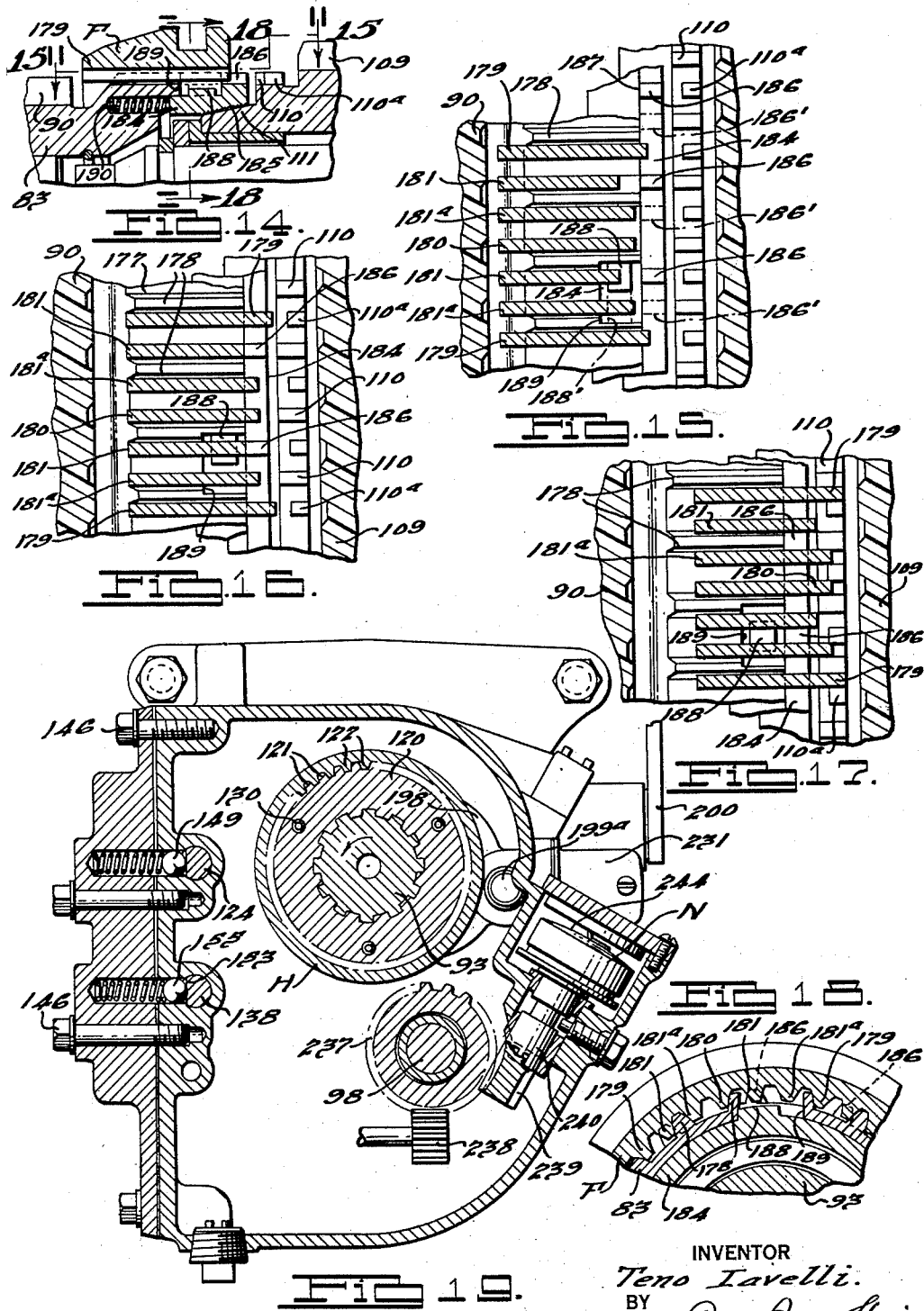

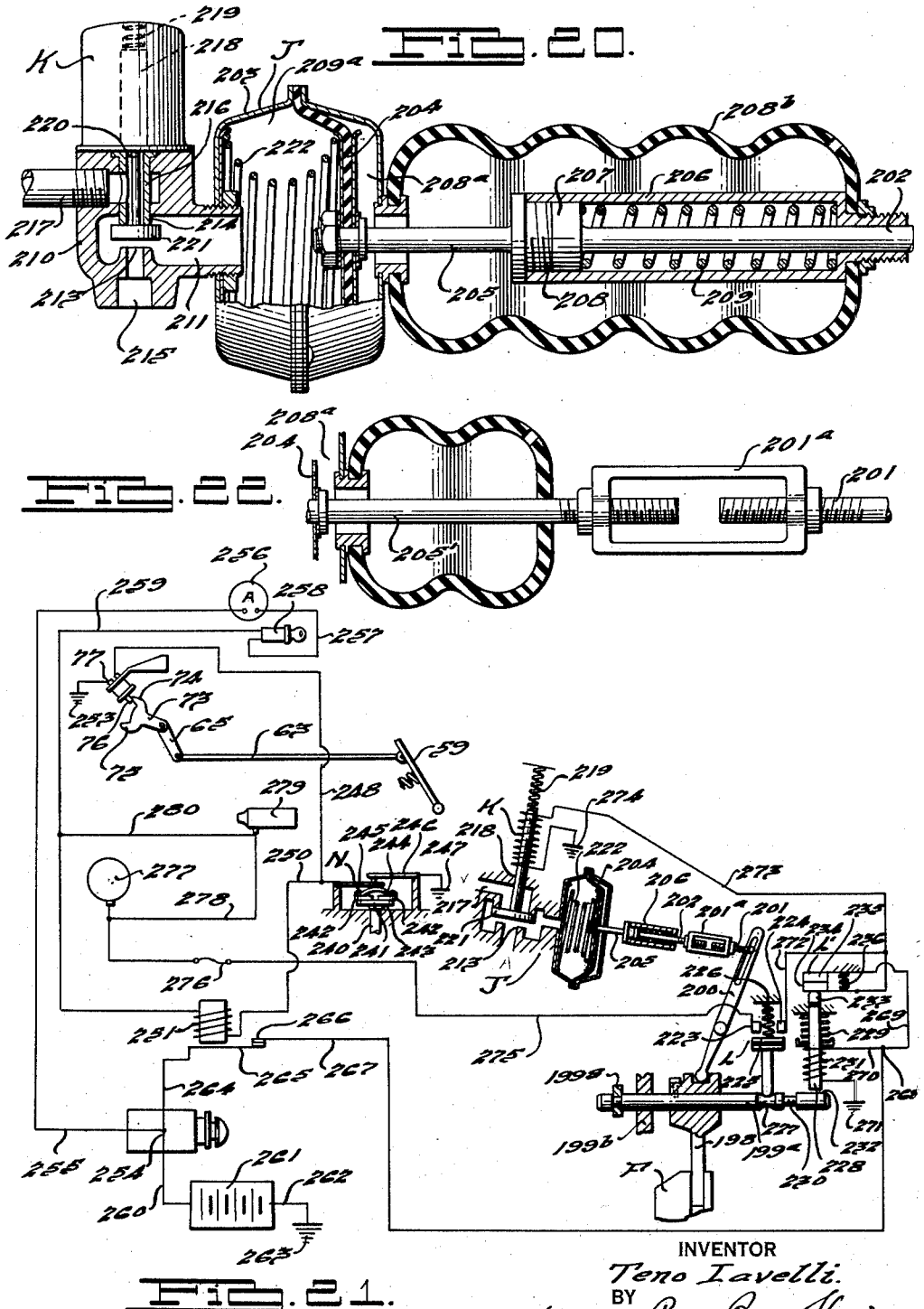

United States Patent Office

2,916,934
Patented Dec. 15, 1959

2,916,934

POWER TRANSMISSION

Teno Iavelli, Detroit, Mich., assignor to Chrysler Corporation, Highland Park, Mich., a corporation of Delaware Application May 11, 1940, Serial No. 334,607

41 Claims. (Cl. 74—472)

This invention relates to power transmissions and refers more particularly to improved driving systems for motor vehicles.

It is an object of my invention to provide a transmission system affording improved characteristics of change speed control with a comparatively simple mechanism capable of long life.

Another object of my invention is to provide a transmission affording improved means for changing speed ratios through the medium of positively engaging clutch means having synchronous control for ensuring clutching without shock or ratcheting noise.

A further object is to provide an improved system of vehicle drive incorporating both manual and automatic change speed control affording improved vehicle driving functions.

I have provided an improved drive system incorporating a fluid coupling and kickdown transmission so constructed as to provide great flexibility of car control with very little effort such that nearly all driving may be done without manipulation of clutch pedals or gear shift levers and at the same time affording flexibility of car control best suited to the changing requirements of torque multiplication and other power transmitting characteristics. My driving mechanism affords improved quietness and smoothness of car operation and facilitates manipulation of the car especially under congested traffic conditions.

I preferably employ a relatively fast axle such that when the transmission is in direct the overall drive is the practical equivalent of an overdrive without driving through gear trains at such time. This is practically obtainable without sacrificing car performance by my improved synchronous clutching means which automatically responds to manipulations of the accelerator pedal for stepping the speed ratio up or down.

With my transmission it is practicable for the driver to stay in a selected speed ratio setting while stopping and thereafter obtain rapid car starting accelerations under favorable torque multiplication and faster ratio boulevard or country drive conditions without operating clutch pedal or gear shift lever.

I have provided a manual selection of high and low ranges in my transmission but in most instances the low range is, by preference, in the nature of an emergency low and when the fluid coupling is employed, very desirable car accelerating characteristics are obtained by manual selection of the high range.

According to the present embodiment of my invention, I have provided a transmission employing countershaft gearing and providing four forward speeds and reverse. Manual selection may be made to high and low ranges in each of which an automatic shift occurs to a faster drive ratio and back to the selected range, the automatic shifting being affected by natural functional manipulations of the accelerator pedal.

In the illustrated embodiment of my invention I have provided a speed responsive control on the automatic shift means controlling this shift in a novel manner.

A further object of my invention is to provide an improved power operating system for controlling the operation of the automatic change speed means, this system being relatively simple in construction and of rugged structure such that it may be manufactured at relatively low cost and depended on for reliable service over a long period of usage. To these ends I prefer to employ pressure fluid as the operating medium for the automatic change speed means and in the present embodiment the fluid medium which I employ is air pressure preferably derived for convenience by utilizing the engine intake suction or "vacuum" as it is commonly called.

My invention is an improvement in the transmission shown and claimed in the copending application of Carl A. Neracher et al., Serial No. 272,734, filed May 9, 1939.

Additional features of my invention are found in the provision of many features of improved construction and functional operation which will be more apparent from the following illustrative embodiments of the principles of my invention, reference being had to the accompanying drawings in which:

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is a sectional view taken along line 5—5 of Fig. 1 showing a portion of the remote control shift.

Fig. 6 is a detail sectional view taken as indicated by line 6—6 of Fig. 5.

Fig. 7 is a detail sectional elevational view of a portion of the engine throttle operating mechanism shown in Fig. 1.

Fig. 8 is an enlarged side view partly in section and partly in elevation showing the Fig. 1 power transmission.

Fig. 9 is a sectional elevational view through the speed ratio changing transmission which is illustrated in elevation in Fig. 8.

Fig. 12 is a sectional plan view taken as indicated by line 12—12 of Fig. 10.

Fig. 13 is a transverse sectional view through the transmission according to line 13—13 of Fig. 8.

Fig. 14 is a detailed enlarged view of the synchronous blocker clutch or coupling mechanism as seen in Fig. 9.

Fig. 15 is a sectional plan view illustrated as a development according to line 15—15 of Fig. 14, the automatic clutching sleeve being released.

Fig. 16 is a similar view showing the automatic clutching sleeve in its intermediate blocked position during the drive blocking condition.

Fig. 17 is a similar view showing the automatic clutching sleeve in full clutching engagement.

Fig. 18 is a transverse sectional view taken as indicated by line 18—18 of Fig. 14.

Fig. 19 is a transverse sectional view through the transmission as indicated by line 19—19 of Fig. 8.

Fig. 20 is a sectional elevational view through the prime mover operator shown as a vacuum motor.

Fig. 21 is a diagrammatic view of the transmission control system.

Fig. 22 is a view corresponding to a portion of Fig. 20 but illustrating a modified form of prime mover operator.

Figure 10:
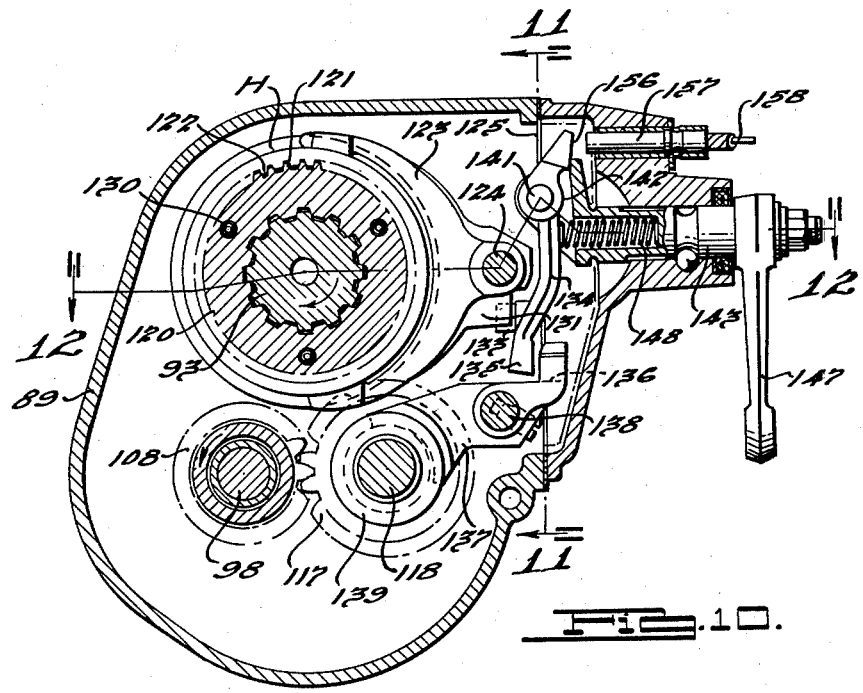
Fig. 10 is a transverse sectional view looking rearwardly as indicated by line 10—10 of Fig. 8, showing the transmission portion of the remote shift mechanism.

I have illustrated the principles of my invention in connection with a motor vehicle drive wherein the usual engine A transmits its drive through clutching means B, C within casing 50, the drive then passing through the change speed transmission D and propeller shaft 51 (Fig. 2) to the differential 52 and thence to the vehicle ground wheels 53 where it is desired to drive the rear wheels according to present day practice.

By preference, the arrangement is such that a "faster" rear axle ratio is afforded than is generally customary so that when the transmission is in direct drive, the car is driven in the equivalent of an overdrive ratio between the engine A and wheels 53. My arrangement provides such conveniently operable kickdown or step-down shift to a reduction drive from direct that the aforesaid arrangement is practicable thereby obtaining advantages of economy, long life and quiteness of operation without the disadvantages of sluggish operation especially for city driving conditions.

The engine A has the customary intake manifold 54 and the carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toe-board 61 to swing downwardly against restoring spring 62 to thrust through the system of pivotally jointed links 63, 64 and connecting lever 65, the latter being pivotally supported at 66.

The link 64 operates lever 57 through a lost motion device (Fig. 7) serving to normally connect these parts as a solid member but affording thrust of link 64 forwardly after lever 57 has engaged its limiting stop 58 to effect the kickdown control on the transmission. Thus, link 64 has its forward end slidable in guide 67 of finger 68 which is pivoted to the lower end of lever 57. A spring 69 acts between finger 68 and a collar 70 fast on link 64 and yields only when link 64 is thrust forwardly after lever 57 has engaged stop 58, the spring otherwise transmitting thrust of link 64 to finger 68 without lost motion. A bracket 71 limits separation between the link 64 and finger 68 and closes the throttle valve 56 when the accelerator pedal is released for upward swing by spring 62.

The throttle operating mechanism therefore is such that movement of pedal 59 throughout its normal range will cause a corresponding adjustment in the valve 56 between its limits of fully closed and wide open positions. When the pedal has been depressed to the wide open throttle position, lever 57 engages stop 58 and further depression of the pedal in its kickdown range of movement for the kickdown transmission control is accommodated by yeilding of spring 69 while the trottle valve remains fully open. On release of the accelerator pedal, springs 69 and 62 both act until collar engages the rear flange 72 of bracket 71 and thereafter, throughout the normal range of throttle adjustment, spring 62 alone serves to restore pedal 59 and close the throttle valve.

The kickdown range of accelerator pedal movement is utilized to momentarily unload the engine of its drive, as by shorting the ignition, and to effect disengagement of the synchronous clutch sleeve for a change in the transmission from direct to underdrive accommodated by unloading the clutch sleeve of the engine drive. The throttle being open will cause the engine to rapidly speed up as soon as the ignition circuit is restored, the underdrive being automatically effective as will presently be more apparent.

The lever 65 has fastened thereto a second lever 73 directed forwardly to provide spaced fingers 74, 75 in the path of the actuator 76 of the snap-switch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77. The ignition circuit, after interruption during kickdown, is not dependent for restoration on release of the pedal 59 but is restored by other means presently described.

I preferably transmit the drive from the engine A to transmission D through clutch means comprising a fluid coupling B of the kinetic type preferably in conjunction with a releasable clutch C of a conventional design primarily employed to facilitate manual shifts in transmission D.

The engine crackshaft 78 drives the coupling impeller 79 to circulate the fluid in its vaned passages to drive the vaned runner 80 in a manner well known for fluid couplings of the type illustrated. The runner 80 drives the clutch member 81 of the friction clutch C of commercial design. Driven clutch disc 82 is fixed to intermediate drive shaft 83 and is drivingly disengaged by depressing a clutch pedal 84 (Fig. 1) which slides throw-out 85 forwardly to operate levers 86 to unload driving pressure plate 87, springs 88 loading this plate and engaging the clutch when pedal 84 is released.

Shaft 83 extends rearwardly into the housing or casing 89 of transmission D (Fig. 9) where it is formed with a main drive pinion 90 and a set of external driving teeth certain of which slidably fit internal clutch teeth of the synchronous coupling clutch sleeve F so that sleeve F turns with transmission driving shaft 83 but may slide rearwardly from its Fig. 9 position relative thereto.

The drive pinion 90 is hollow and journals, by a bearing 92, the forward end of the transmission driven shaft 93 which may carry a propeller shaft brake drum 94 having the braking mechanism generally designated at 95 operably associated therewith. The drive pinion 90 is continuously meshed with a gear 96 for driving the countershaft cluster 97 rotatable on a countershaft support 98. The cluster 97 has a forward extension 99 journalled at 100 within gear 96 and between these parts 99 and 96 there is provided an overrunning clutch G (Figs. 9 and 13). The usual speedometer drive gears are shown at 100$^a$ fixed to shaft 93 and 100$^b$ for driving the usual speedometer cable.

The clutch G comprises a driving cylinder clutching member 101 formed within gear 96, and an inner driven cammed member 102 formed on extension 99. Rollers 103 are disposed between clutch members 101 and 102 such that these rollers are wedged to clutch these members together when the gear 96 tends to rotate faster than extension 99 in the direction of forward drive of the car while allowing the extension 99 to freely overrun gear 96. Assuming the usual clockwise direction of driving shaft 83, when looking from the front to the rear, then clutch G engages when, as viewed in Fig. 13, the gear 96 tends to rotate clockwise faster than extension 99. A cage 104 positions the rollers 103 in proper spacing, a spring 105 yieldingly urging the rollers in the direction of their engagement as is customary in overrunning clutches.

The cluster 97 is further formed with reduction gears 106, 107 and reverse gear 108, these three countershaft gears being of relatively decreasing diameter in the order mentioned. Gear 106 is in constant mesh with a gear 109 which is freely journalled on driven shaft 93. This gear has a forward extension formed with a set of external clutch teeth 110, 110$^a$ and a friction cone clutch member 111, the gear having a rear extension also formed with a set of clutch teeth 112 and friction cone clutch member 113. Teeth 110 are relatively long and alternate with relatively short teeth 110$^a$.

The gear 107 is constantly meshed with a low speed gear 114 freely journalled on driven shaft 93 and having a forward extension likewise formed with clutch teeth 115 and cone clutch member 116. The reverse gear 108 is adapted to mesh with a reverse idler gear 117 (Figs. 10 and 11) when the latter is slid forwardly on its countershaft 118. At such time the idler 117 also meshed with a gear 119 fixed on the driven shaft 93.

The arrangement is such that shaft 93 may be selectively clutched at the will of the driver with gears 114 and 109, the control preferably comprising a manual remote shift of any suitable type and construction. The operation of clutch sleeve F is, on the other hand, automatic in its operation of clutching driving shaft 83 with gear 109 for disconnecting these parts. The manual clutching control comprises the following mechanism.

Fixed to driven shaft 93 is a hub 120 (Figs. 9 and 19) formed with external teeth 121 slidably engaged with the internal teeth 122 of the shiftable clutch sleeve H adapted for forward and rearward shift by a yoke 123 fixed to a longitudinally extending shaft rail 124 disposed to one side of shaft 93 adjacent the side opening 125 of casing 89.

Synchronizing blocker rings 126, 127 are respectively disposed between gears 109, 114 and hub 120 and are driven with hub 120 with slight rotative clearance. These blockers have cammed teeth 128, 129 having a pitch circle the same as that of sleeve teeth 122 and teeth 112 and 115 and they are adapted to frictionally engage the clutching members 113 and 116 respectively. If desired, energizing springs 130 may be provided between the blockers to lightly urge them into engagement with cones 113 and 116 respectively so that the blocker teeth 128, 129 are misaligned with the sleeve teeth 122 thereby preventing shift of sleeve H as long as the parts to be clutched are rotating at different speeds. The synchronizing blocker rings are more fully described and claimed in the copending application of O. E. Fishburn, Serial No. 180,840, filed December 20, 1937, now Patent No. 2,333,165, dated November 2, 1943.

When sleeve H is moved forwardly, teeth 122 engage the cammed ends of blocker teeth 128 thereby urging the blocker under pressure engagement with cone 113 to synchronize gear 109 with shaft 93 (clutch C being released during manual shift of sleeve H to facilitate the clutching action). Then the blocker 126 will rotate slightly relative to hub 120 to permit the sleeve teeth 122 to pass through blocker teeth 128 to engage teeth 112 to positively clutch shaft 93 with gear 109. The rearward shift of sleeve H to clutch with teeth 115 of gear 114 is synchronously effected under control of blocker 127 in the same manner.

The yoke 123 is provided with a boss 131 below rail 124 (Figs. 10 and 11), this boss having a slot 132 adapted to be engaged by an inwardly extending pin 122 carried by a lever 134. This lever has a lower end 135 adapted to engage a slot 136 of a yoke 137 fixed to the reverse shift rail 138 parallel to and below rail 124. The yoke 137 engages the collar portion 139 of the shiftable reverse idler gear 117. Rails 124 and 138 are interlocked by plunger 140 to prevent their simultaneous displacement.

Figure 11:
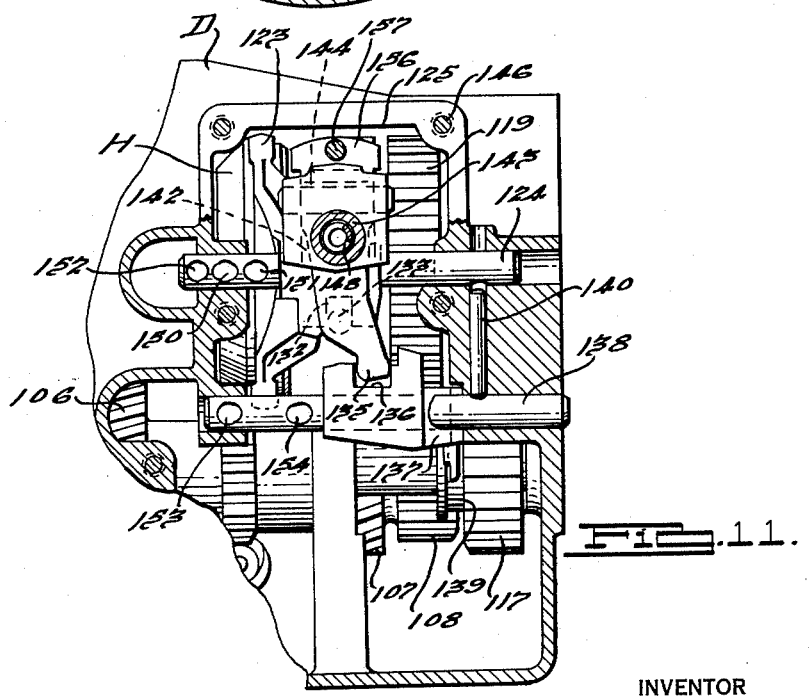
Fig. 11 is a detail sectional view taken as indicated by line 11—11 of Fig. 10.

Lever 134 is supported between its ends by a pin 141 parallel to and above rail 124, this pin being carried by the yoked inner end 142 of a shaft 143 rotatably mounted in the boss 144 of a cover 145 secured by fasteners 146 to the opening 125 of casing 89. The shaft 143 has its axis extending across the axis of movement of the rails 124 and 138 and has a lever 147 fixed to its outer end outside of the cover 145. A spring 148 reacts on shaft 143 and yieldingly urges lever 134 clockwise (Fig. 10) about pin 141 tending to maintain pin 133 engaged in slot 132, and end 135 free from slot 136. A spring pressed ball detent 149 yieldingly maintains rail 124 in neutral, forwardly (to clutch sleeve H with teeth 112) or rearwardly to clutch sleeve H with teeth 115) by engagement of this ball detent with the rail recesses 150, 151 and 152 respectively. The reverse rail 138 has neutral and reverse positioning recesses 153, 154 respectively engaged selectively by a spring pressed ball detent 155 (Fig. 10).

The upper end of lever 134 has a wide face 156 engageable with the inner end of a plunger 157 slidable inwardly through cover 145 by a Bowden wire operating mechanism 158. When the wire 158 is pushed, the plunger 157 engages lever face 156 to swing the lever 134 so that the end 135 engages slot 136 while pin 133 disengages slot 132. In such position, the shaft 143 may be rotated to shift rail 138 to mesh reverse idler 117 with gears 108 and 119 for the reverse drive. The plunger 157 maintains a sliding engagement with lever face 156 during this rotation of shaft 143. The remote control mechanism for effecting control of lever 147 and Bowden wire 158 will now be described (Figs. 1 and 3–6).

The fixed steering post 159 houses the usual steering shaft 160 operated by hand steering wheel 161. Rotatably journalled within post 159 is a hollow shaft assembly 162 connected by pivot pins 163 with the yoked inner end 164 of the manually operable selector element or shift lever 165 which extends outwardly through an arcuate opening 166 formed in the head 167 fixed to post 159. Movement of lever 165 fore and aft about the axis of shaft 162 will oscillate this shaft while movement of the lever up and down will rock the lever about a fulcrum 168 to cause reciprocation of shaft 162 in the direction of its axis.

At the lower end of shaft 162 there is a lever 169 fixed thereto, this lever having an intermediate wide face portion 170 always engaged by the upper end of a plunger 171 fixed to the forward end of Bowden wire. A spring 172 operates to yieldingly urge plunger 171 engaged with the lower surface of portion 170 and plunger 157 positioned as in Fig. 10 free of lever face 156. A link 173 has its forward end pivotally engaged with the outer end of lever 169, the rear end of this link being connected with a bell crank lever 174 mounted on engine A at 175. The bell crank operates a second link 176 which has articulated connection with lever 147.

In order to shift sleeve H with the teeth 115 of the low speed drive gear 114, the operator disengages the main clutch C by depressing pedal 84, and then swings lever 165 forwardly or counterclockwise from neutral as viewed in Fig. 4. This pushes the lever 147 for rearward swinging movement serving to shift rail and sleeve H rearwardly. Pedal 84 is then released for the low drive. Shift of lever 165 rearwardly will slide rail 124 and sleeve H forwardly to clutch with the teeth 112 of the gear 109 to obtain the third speed ratio of the four available forward speeds.

In order to effect the reverse drive, the lever 165 is first rocked upwardly in neutral to thereby push downwardly through shaft 162 to cause lever portion 170 to operate through the Bowden wire 158 to swing lever 134 to engage lever end 135 with slot 136. Then the lever 165 is shifted rearwardly to cause lever 147 to rock the lever 134 to effect forward shift of rail 138 and idler 117 into mesh with gears 108 and 119. The clutch C is preferably released to effect manual shifts of sleeve H and reverse idler 117.

Blocking means is provided to limit rearward shift of clutch sleeve F whenever shaft 83 and gear 109 are rotating at different speeds, the blocking action being such that the sleeve F will clutch only when the engine is coasting. The details of the blocking means is best shown in Figs. 14–18.

The rear end of shaft 83 beyond pinion 90 is externally toothed, every other tooth being cut away, to provide spaces 177 between driving teeth 178. The clutch sleeve F has internal teeth formed in a repeating pattern best shown in Figs. 15, 16 and 17. Every sixth tooth 179 is relatively long and engages one of the teeth 178. Spaced equally between each pair of adjacent teeth 179 is a tooth 180 also engaging a tooth 178. The teeth 180 are cut back at their rear ends so that they are of somewhat less length than the teeth 179. Between adjacent pairs of teeth 179, 180 are the blocked teeth 181, 181ᵃ. These teeth have at least one of their side faces in sliding engagement with a tooth 178. The pairs of teeth 181, 181ᵃ are spaced apart to receive the blocker teeth therebetween. The teeth 181ᵃ are longer than teeth 181 and therefore one tooth 181ᵃ of each pair of blocker-engaging teeth 181, 181ᵃ extends rearwardly axially beyond the other tooth 181 of such pair so that for convenience of reference teeth 181ᵃ may be said to be longer than teeth 181 although obviously the forward ends of teeth 181 and 181ᵃ may not be circumferentially aligned.

A blocker synchronizing ring 184 lies between the gears 109 and 90 and comprises a friction cup clutching surface 185 which may be formed as a fine thread as disclosed in the aforesaid Fishburn application, or plain if desired, to engage the surface of cone 111 to obtain the blocker action. The blocker ring is formed at its rear end with upstanding blocker teeth 186 having forwardly directed end faces 187 engageable with the rear ends of sleeve teeth 181ᵃ and 181. The blocker ring rotates with the driving shaft 83 and sleeve F with relative rotation accommodated so that blocker teeth may move between the solid line and dotted line showing 186′ in Fig. 15 at which times the blocker teeth are axially aligned with blocked teeth 181 and 181ᵃ respectively.

The blocker ring drive is provided by a plurality of upstanding lugs 188 formed as a part of ring 184. Ordinarily two lugs are sufficient, disposed at diametrically opposite points. The rear edge of the driving shaft is cut or notched at 189 to receive a lug 188 with sufficient clearance circumferentially to allow the blocker teeth 186 to rotate relative to the sleeve teeth within the aforesaid limits. A plurality of light springs 190 may be provided between the driving shaft 83 and blocker ring 184 to urge the blocker surface lightly into frictional engagement with cone 111 so that the blocker ring tends to rotate with gear 109.

From the foregoing it will be apparent that whenever the speeds of shaft 83 and gear 109 are different from each other, the blocker ring 184 will move into position to block forward shift of sleeve F. In Fig. 15, the sleeve F is in its disengaged forward position, the blocker ring tending to lag behind the driven shaft 83 and sleeve F which is the condition when the gear 109 is rotating slower than the driving shaft and when the sleeve is not urged rearwardly. When gear 109 rotates faster than the driving shaft, as when the engine coasts, then the friction drag at cone 111 drags the blocker ring rotatably forwardly (clockwise looking front to rear) ahead of the driving shaft until the lugs 188 engage the ends of slots 189 opposite to the end engaged in the Fig. 15 showing. At this time the blocker teeth are at their positions shown at 186′ ready to block the long sleeve teeth 181ᵃ. In either instance rearward clutching shift of sleeve F is blocked by the blocker teeth 186.

The arrangement is such that the sleeve will not shift rearwardly of the blocker teeth 186 except when the engine is allowed to coast from a previous condition of drive. Therefore, whenever the engine is driving the car and the sleeve F shifts rearwardly, the sleeve will be blocked against ratcheting with teeth 110, 110ᵃ. Furthermore, clutching of sleeve F is limited to coasting down of the engine to synchronism with teeth 110, 110ᵃ from a condition where the engine and sleeve F were rotating faster than the teeth 110, 110ᵃ.

The means for urging sleeve F rearwardly will be presently described. However, let us assume at this time that a force is to be applied rearwardly to sleeve F while the sleeve is in the Fig. 15 position of release. Several conditions may arise depending on whether the engine is driving or coasting. Assuming that sleeve F is urged rearwardly while the engine is driving the car in a reduction drive ratio, as when the driving shaft 83 and sleeve F are rotating forwardly faster than gear 109. Under such conditions the blocker 184 will lag sleeve F and the blocker teeth 186 and lugs 188 will be positioned as in Fig. 15 (solid lines). Now as a force is applied to move the sleeve F rearwardly, the teeth 181 will strike teeth 186 and further shift of the sleeve will be blocked as long as the engine continues to drive in this drive blocking relationship. This condition is shown in Fig. 16 which may be said to represent an intermediate or blocked position of the sleeve at the time that the sleeve is rotating faster than gear 109. If now the accelerator pedal is released to allow the engine to coast, while gear 109 continues to freely rotate, the sleeve F will rapidly slow down until it synchronizes with gear 109. Then, as the sleeve starts to drop just slightly below the speed of gear 109, the blocker 184 will rotate with this gear and the sleeve will lag the blocker by an amount equal to half the total travel of lugs 188 which total travel is from the Fig. 15 solid line position to the Fig. 15 dotted line position. The half travel is indicated by the position of lugs 188 in Fig. 17. This is necessarily so because of the long teeth 181ᵃ, the rear ends of which (Fig. 15) axially overlap the blocker teeth 186 so that the sleeve lags only until these teeth 181ᵃ strike the sides of the blocker teeth at this approximately synchronized condition between the sleeve F and gear 109. As soon as this condition is reached the sleeve F moves rearwardly so that the blocker teeth 186 pass between adjacent teeth 181, 181ᵃ and the long teeth 179 will each enter a space between the long teeth 110 so as to glance off a short tooth 110ᵃ. As the long teeth glance off the teeth 110, the engine coasts down slightly more until the long teeth, now thrust forwardly between teeth 110, strike against the sides of teeth 110 and at this time the engine cannot coast down any more relative to gear 109. Any continued coast of the engine will simply serve as a brake on the car travel or in other words the engine cannot then slow down except as permitted by the car slowing down with it. During such further coast the drive friction from teeth 110 to teeth 179 will ordinarily prevent the full or secondary clutching movement of sleeve F as the force applied to shift sleeve F is ordinarily by preference not sufficient to overcome this friction but the next time the torque is reversed between sleeve F and gear 109, as when the engine is speeded up to take over the drive, then the sleeve will instantly shift fully rearwardly to the Fig. 17 position. As the torque changes from coast to drive, the teeth 179 cannot jump ahead beyond a short tooth 110ᵃ because of the impressed rearward force on sleeve F which will shift the sleeve the instant the sleeve teeth are unloaded and also because on coast, the teeth 179 will enter a slight distance between a pair of teeth 110, 110ᵃ before further rearward movement of sleeve F is prevented by the coast friction between teeth 110 and blocker teeth 186. If, during the coast when blocker teeth 186 first enter the spaces between the teeth 181, 181ᵃ, the teeth 179 strike the ends of teeth 110, then the sleeve will slide off these teeth 110, glance off teeth 110ᵃ, and engage the sides of the next teeth 110 for the initial clutching. The long teeth 179 will in any event insure clutching on coast between the sleeve F and gear 109 at approximately a condition of synchronism between these parts.

From the foregoing it will be apparent that the long teeth 179 function as primary engaging teeth and the teeth 180, 181ᵃ function as secondary engaging teeth in that initial clutching is effected first of all by engagement of the primary teeth 179 with the longer teeth 110 of gear 109 followed by engagement of the pairs of secondary teeth 180, 181ᵃ with the teeth of this gear as in Fig. 17. Here again, for convenience of reference, teeth 110, 110ᵃ may be respectively designated as long and short teeth to conveniently define their difference in lengths radially in the direction of the driving shaft 83. Of course, where the relationship of the shifting force applied to sleeve F is such as to overcome the friction of 179 and 110 during the coast clutching, then the secondary clutching will take place during the coast instead of on the instant of torque reversal. However, in any event, positive clutching to some degree will take place during coast.

Now let us assume that the force applied rearwardly to sleeve F occurs at a time when the sleeve lags the blocker. Under such conditions the teeth 181ª will almost immediately engage teeth 186 and the sleeve will be blocked. This is an important relationship in insuring against attempted clutching of sleeve F with teeth 110, 110ª at this non-synchronized time. Now, with the sleeve teeth 181ª blocked by the blocker teeth at positions 186' as when the engine is coasting, let us assume that the engine is speeded up by the car driver depressing the accelerator pedal in the usual manner. This will cause the sleeve to immediately rotate ahead of the blocker until lugs 188 engage the following ends of slots 189 and the sleeve will move rearwardly until the parts are positioned as in Fig. 16 with teeth 181 blocked by teeth 186. The function of the short teeth 181 relative to long teeth 181ª will now be apparent because when the driver depresses the accelerator pedal in the usual manner to cause the sleeve F to move ahead of the blocker, teeth 181ª slide off the ends of teeth 186 but the blocker teeth do not have time to enter the spaces between teeth 181, 181ª but instead, the blocker teeth jump these spaces and block teeth 181 which are made sufficiently shorter than teeth 181ª to insure this action. When the parts assume the Fig. 16 positions, which is the drive blocking condition, then on slowing down the engine, as when the driver releases the accelerator pedal, the clutching of sleeve F will occur during the coast just as in the foregoing example of a typical clutching of the sleeve.

The automatic control for shifting sleeve F will now be described. This sleeve has a shifting groove 197 engaged by a yoke 198 which is secured to a shift rail 199ª shiftable longitudinally of the transmission in guides 199ᵇ and 199ᶜ. For shifting this rail and yoke 198 as a unit, there is a transversely extending rock shaft 199 to which is fixed the downwardly extending lever 199ᵈ engaging a groove 199ᵉ in yoke 198. The rock shaft 199 extends outside the transmission where it carries, fixed to the rock shaft, an operating lever 200 which extends upwardly. A link 201 connects the upper end of lever 200 through a turn-buckle adjusting device 201ª with the rear end of a follower rod 202 of the prime mover means preferably in the form of a pressure fluid motor J. My arrangement is such that the sleeve F is operated rearwardly in its clutching shift by the action of the pressure fluid which acts preferably through the medium of a spring such that the prime mover may operate ahead of the sleeve clutching and such that only a predetermined shifting force is applied to sleeve F thereby protecting the teeth against damage and insuring uniform conditions of operation for the sleeve.

The motor J, in the present embodiment, is of the so-called vacuum type as the fluid medium acting on the motor piston is air rendered effective by subjecting the piston to the intake manifold of the engine. Thus a casing or cylinder 203 houses the piston 204 of the diaphragm type, the latter being fixed to a leader piston rod 205 which has a hollow tube 206 fixed to its rear end. This tube slidably receives therein the forward headed end 207 of rod 202, this head 207 at times abutting the stop 208 of piston rod 205. A spring 209 acts between tube 206 and head 207 to yieldingy urge rod 202 forwardly when rod 205 moves forwardly for the clutching of sleeve F where the latter is released by positive actuation of rod 202 by the rearward thrust of stop 208 against head 207. Air under atmospheric pressure is unrestrictedly present in the chamber 208ª as the flexible dirt-seal 208ᵇ is not air-tight. The other chamber 209ª is selectively placed in communication either with a source of pressure fluid different from atmospheric pressure, such as the intake manifold, or else with the atmosphere when the chamber 209ª is to be vented.

The motor housing 210 has a chamber 211 which is open to chamber 209ª. Lower and upper valve seats 213, 214 define passages for respectively controlling the venting and "vacuum supply" to chambers 211 and 209ª. When passage 213 is open then the chamber 211 is vented to the atmosphere by passage 215 and when passage 214 is open then the chamber 211 is placed in communication with the low pressure region of the engine intake manifold 54 by way of tubular conduit 216 and pipe 217.

In order to control the passages 213 and 214 so that when either is closed the other is open, I have provided an electrical solenoid K having an armature plunger 218 yieldingly urged downwardly by a spring 219. This armature has a part 220 extending through tube 216 and carrying a valve part 221 at its lower end adapted respectively to engage the valve seats 213, 214 to close and open these passages. In Fig. 20 the solenoid K is shown energized, the armature 218 being raised against spring 219 thereby seating valve 221 and opening passage 213 so as to vent chamber 209ª and allow the piston 204, under certain conditions hereinafter set forth, to move rearwardly under the action of a heavy spring 222 to release the sleeve F from teeth 110, 110ª and cause the sleeve to occupy the Fig. 9 position. This releasing movement of the sleeve is limited by engagement of the shift rail 199ª with casing part 199ᶠ (Fig. 12), the rearward clutching shift of the sleeve being limited by a snap ring 199ᵍ engaging the guide 199ᵇ. When the solenoid K is deenergized, the armature 218 is lowered by spring 219 thereby seating valve 221 on passage 213 so as to close the vent and open the vacuum supply to chamber 209ª. This causes the piston 204 to move forwardly under power, compressing spring 222 and moving rod 205 forwardly or to the left as viewed in Figs. 20 and 21.

When piston 204 is forced forwardly by the action of pressure fluid thereon, rod 202 and sleeve F may move rearwardly only to one of the blocked positions of the sleeve while the piston 204 moves on to complete its stroke accommodated by loading spring 209 against head 207. Then at such time that the engine is allowed to coast to synchronize gears 90 and 109, the rod 202 is actuated by the preloaded spring 209 to complete the clutching shift of sleeve F.

I have provided torque unloading means for effecting a momentary reversal or diminution of torque between the teeth of sleeve F and teeth 110, 110ª such that when it is desired to release the sleeve, at times when there is torque transmitted between the aforesaid teeth, this may be accomplished by auomatically unloading the sleeve by reducing the torque.

The unloading of sleeve F is accomplished by a momentary grounding or shorting of the engine ignition system under control of an ignition interrupting switch L. This switch has fixed terminals 223, 224 open, as in Fig. 21, for normal operation of the ignition system and adapted to be closed to render the ignition inoperative in conjunction with further controls presently to be described. The switch terminals are bridged and the switch thereby closed by a movable contact 225 in the form of a reciprocable plunger, a spring 226 acting to urge the plunger in open-switch position, as in Fig. 21. Under such conditions the inner rounded end of the plunger 225 is received in the curved recess 227 of shift rail 199ª (sleeve F being released). When clutching of the sleeve F takes place, accompanied by rearward shift of rail 199ª and sleeve F, then plunger 225 is cammed out of the recess 227 so that the lower end of the plunger rests on the main body portion of rail 199ª and the switch L is maintained in its closed position ready to interrupt the engine ignition system at the proper time.

The following mechanism is provided in order to latch the sleeve operating means so that once the motor J has been operated by pressure fluid to clutch the sleeve F, the sleeve will not thereafter disengage upon loss of pressure fluid. This mechanism is also arranged to control the operation of the ignition system, supplementing the switch L, and also to control the solenoid K. Such features are particularly advantageous in connection with the use of intake manifold vacuum to operate the piston because the presence of a vacuum depends of course on the throttle valve opening and accelerator pedal position. Inasmuch as the sleeve F clutches only on engine coast, as when the accelerator pedal is released, the vacuum system is advantageously employed because the vacuum is assured incident to release of the accelerator pedal. Once the latch means operates then engagement of sleeve F is independent of the presence of vacuum. The term "vacuum" is used herein in a broad sense as denoting subatmospheric pressure and not, of course, in the strict sense of the term.

The latching mechanism comprises a latch plunger 228 adapted, when the sleeve F is clutched, to be urged inwardly by a spring 229 so that the inner end of the plunger engages a groove 230 in rail 199ᵃ thereby to fix the rail and sleeve against shifting out of the clutched position. In order to release the latch at times when it is desired to return sleeve F to its Fig. 21 released position, I employ a solenoid 231 which when energized will move the plunger-armature 228 outwardly against the force of spring 229 and preferably so that the inner end of the plunger has a clearance 232 with rail 199ᵃ. Once the latch plunger 228 is free of the groove 230 then the sleeve F is free to be shifted back to its released position under power of the spring 222.

In order to utilize the latch plunger 228 as a control on the solenoid K and the ignition system, the plunger 228 is extended outwardly at 233 so that when solenoid 231 is energized as in Fig. 21 the plunger extension 233 will swing movable switch contact 234 outwardly against the fixed switch contact 235 so as to close this switch which may be designated L'. A spring 236 yieldingly acts on contact 235 so that when the solenoid 231 is deenergized then the switch L' will be opened because the clearance 232 will also permit spring 229 to lower latch 228 thereby allowing spring 236 to swing contact 234 inwardly away from contact 235. Also, when sleeve F is clutched, plunger 228 is latched in groove 230 and contact 234 is further separated from contact 235.

Whenever the car is being driven, the countershaft 97 is drivingly connected with the driven shaft 93 and this relationship is conveniently utilized for controlling the automatic operation of sleeve F as a function of car speed in the following manner. It is desired to note in passing that the governor control about to be described may, if desired, be omitted although it is included by preference in order to improve the functional operating characteristics of the transmission D. The drive of the governor from the countershaft, rather than from the driven shaft 93, is of advantage in controlling the functions of sleeve F during the various speed ratios afforded by transmission D.

Referring to Figs. 9, 19 and 21 the pump drive gear 237 which drives the lubricating pump (not shown) through a gear 238, also drives a gear 239 having a shaft portion 240 which operates a governor switch N of any suitable type. In Fig. 21 the shaft 240 has a head 241 which carries a pair of weights 242 eccentrically mounted by pins 243. The weights are connected by a flexible flat metal spring member 244 which is normally bowed upwardly (when shaft 240 is rotating below a predetermined speed) to spring the electrical contact 245 into engagement with fixed contact 246 which is grounded at 247. Thus when the car is standing still or when shaft 240 is rotating below a predetermined critical speed, the wire 248 for contact 245 is grounded through engagement of the switch parts 245, 246. When shaft 240 exceeds its critical speed, which may be varied as desired by the arrangement of weights 242 and spring 244, the weights 242 rotate about pins 243 sufficiently to flex the spring 244 downwardly whereupon contact 245 flexes down enough to open the switch by moving out of contact with switch piece 246.

The wire 248, which leads to the contact 245, has the branch conducting wire 250 which leads to a solenoid relay 251 where it is desired to employ a relay control of the solenoids 231 and K.

The wire 248 continues to one terminal of the kickdown switch 77 which has its other terminal grounded at 253. The usual starter terminal 254 has a lead 255 to the ammeter 256 the circuit continuing by wire 257 to the usual ignition switch 258 and extends through primary wire 259 of the aforesaid horn and solenoid relay 251, this wire then continuing at 250.

Starter terminal 254 is connected through wire 260, storage battery 261 and wire 262 to ground 263. The starter terminal is also connected to the solenoid relay circuit comprising wire 264 leading to relay switch piece 265 shown in Fig. 21 as energized by relay solenoid 251 to contact at 266 to continue the relay circuit through wire 267 which branches at 268 into wires 269, 270. Wire 270 leads to the windings of solenoid 231 and thence to the ground 271 whereas wire 269 extends to contact 235 of switch L'.

The other contact 234 of switch L' connects through a wire 273 with the windings of solenoid K and thence to ground 274. This contact 234 is also electrically connected with contact 224 of switch L by reason of wire 272 between wire 273 and contact 224. If desired the wire 272 could lead to contact 235 instead of 234 but then the ignition interruption would be for a slightly longer time. It is preferred to have switch L' control the ignition interruption in conjunction with switch L. The other contact 223 of switch L connects through wire 275 and fuse 276 to the distributor 277, thence through wire 278 to coil 279 and thence by wire 280 to wire 259.

From the foregoing wiring diagram it will be apparent that the following circuits are formed.

The governor circuit when closed at the governor switch N is adapted to direct the sleeve F to its released position as in Fig. 21. With the parts as in Fig. 21, assuming ignition switch 258 closed, a primary governor circuit is formed from ground 247 to ground 263 as follows: governor switch N, wire 250, relay 251 to wire 259, ignition switch 258, wire 257 and ammeter 256 to wire 255 thence through wire 260 and battery 261 to ground 263.

When this primary governor circuit is thus established, relay 251 closes relay switch 265 and this forms first of all a solenoid latch-releasing relay circuit from ground 263 to ground 271 as follows: ground 263 and battery 261 to starter terminal 254, thence through wire 264 and relay switch 265 to wires 267 and 270, solenoid 231 and ground 271.

When the solenoid latch-releasing relay circuit is thus formed, the armature-latch 228 is moved outwardly. Assuming that relay switch 265 is open at the time that governor switch N is closed, as when the vehicle approaches a stop with the sleeve F clutched, solenoid K deenergized, latch 228 engaged in groove 230, switch L closed and switch L' open, then it will be apparent that when governor switch N closes to establish the primary governor circuit and therefore the solenoid latch-releasing circuit, the latch 228 will first of all be moved out of groove 230 to release shift rail 199ᵃ and sleeve F. Outward movement of latch 228 then closes switch L' which immediately establishes two circuits, one being a main solenoid relay circuit for energizing solenoid K, and the other being an ignition interrupting circuit for disabling the engine ignition system so as to enable unloading of the teeth of sleeve F so that the sleeve may be immediately shifted to its released position.

The aforesaid main solenoid relay circuit which is established when switch L' closes extends from ground 263 to ground 274 as follows: from ground 263 to branch 268 this circuit is the same as the solenoid latch-releasing relay circuit, thence from 268 by wire 269 and switch L' to wire 273, solenoid K and ground 274. Therefore, if sleeve F is clutched when governor switch N closes, then after latch 228 is released thereby closing switch L', this main solenoid relay circuit is formed to cause solenoid K to move valve 221 to the Fig. 21 venting position whereupon spring 222 urges declutching of sleeve F. Simultaneously with the energization of solenoid K the torque at teeth 110, 110a and sleeve F is automatically reduced to unload the sleeve and allow the spring 222 to release the sleeve by leader rod 205 thrusting positively at its stop 208 against the head 207 thereby thrusting through follower rod 202, adjusting turnbuckle 201a, link 201, lever 200 and rail 199a which moves forward to the Fig. 21 position.

The ignition interrupting circuit which is established by closing switch L' simultaneously with the establishment of the main solenoid relay circuit extends from ground 271 to ground 263 when the sleeve F is clutched thereby causing plunger 225 to close switch L. This grounding circuit is as follows: ground 271 through solenoid 231 and wire 269 to switch L', thence through wires 273 and 272 through switch L, wire 275 and fuse 276 to the distributer 227, coil 279, ignition switch 258, ammeter 256, battery 261 and ground 263 by way of wires 278', 280, 259, 257, 255, 260 and 262. Just as soon as the switch L' is closed to vent the motor J and interrupt the engine torque then spring 222 shifts rail 199a forwardly to release sleeve F whereupon plunger 225 enters recess 227 to open switch L and restore the engine ignition independently of whether switches 77 or N are then open or closed. The ignition interruption is, of course, only momentary and not noticeable to the operator.

For convenience of reference certain symbols may be employed to refer to the various described circuits as follows:

Circuit: Symbol
- Governor primary circuit _____ GC
- Kickdown primary circuit _____ KC
- Latch-releasing relay circuit _____ LC
- Solenoid relay circuit _____ SC
- Ignition interrupting circuit _____ IC The KC circuit is identical to the GC circuit from wire 250 to ground 263 and further comprises ground 253, kickdown switch 77, wire 248 to said wire 250 and thence to ground 263.

It will be apparent that the LC circuit is established by closing the relay switch 265 whenever either of the primary circuits GC or KC is established. Therefore, when sleeve F is clutched, a down-shift will occur in the transmission whenever governor switch N or kickdown switch 77 is closed accompanied by operation of the LC circuit to release latch 228 and close switch L' whereupon circuits SC and IC come into action to vent motor J and unload sleeve F for declutching and automatic restoration of the engine ignition.

The operation of the power transmission is as follows:

With the car parked, the transmission D will of course be in neutral, with the manually shiftable sleeve H and the automatically shiftable sleeve F positioned as in Figs. 9 and 12. The ignition is off at switch 258 and the solenoid K is deenergized, and the piston 204 is in the Fig. 20 position, the spring 222 being free to maintain the sleeve F in its disengaged position.

The engine is normally started with the transmission in neutral. As soon as the ignition switch 258 is closed, preparatory to starting the engine, the solenoid K will be energized and will move valve 221 upwardly to the Fig. 21 position because at this time the governor switch N is closed as in Fig. 21 thereby establishing the GC, LC and SC circuits by reason of which latch 228 is held out from rail 199a and the solenoid K is maintained energized as aforesaid. The IC circuit is not closed because switch L is open. The coupling sleeve F remains in its forward released Fig. 9 position.

To start in the lowest or slowest driving speed ratio, ordinarily called first, the driver depresses clutch pedal 84 to release the clutch C and then shifts the selector lever 165 forwardly to the low range thereby causing the manual sleeve H to shift rearwardly for blocker synchronizing clutching with the teeth 115 of the low speed gear 114. This shift is facilitated by release of clutch C thereby disconnecting the pinion 90 from the engine A and coupling B.

The driver then releases the pedal 84 to engage the clutch C while depressing the accelerator pedal 59 to start the car in first. The drive in first is obtained as follows: pinion 90 drives gear 96 which causes engagement of overrunning clutch G to drive countershaft 97, gear 107 driving gear 114 whence the drive passes through sleeve H and hub 120 to the output shaft 93.

In the event that the driver holds the accelerator pedal depressed so that the car is accelerated in first to a sufficient speed to cause the governor switch N to open, the GC circuit is broken and solenoids K and 231 will be deenergized to cause latch 228 to take up clearance 232 so that it is ready to latch the rail 199a at the end of its pressure fluid stroke but while the accelerator is thus depressed the manifold pressure will ordinarily not be sufficient to operate piston 204 forwardly. If, however, the engine continues to drive the car in first above the speed at which the governor switch N opens, and the accelerator is then at least partially released sufficiently to cause pressure fluid operation of piston 204, then the piston moves forwardly from its Fig. 20 position along with rod 205 and cylinder 206, the spring 209 compressing to afford a lost motion connection between rods 205 and 202. However, although the piston 204 compresses spring 209 thereby urging clutching shift of sleeve F, the rod 202 moves forward only slightly in shifting sleeve F from its Fig. 15 position to its Fig. 16 drive blocking position. Actual clutching of sleeve F will then take place when the sleeve F is allowed to slow down to synchronize with the speed of rotation of gear 109. Recess 227 is preferably such that initial movement of sleeve F to its Fig. 16 blocked position will not close switch L although as switch L' is open whenever sleeve F moves rearwardly no change will occur to the engine ignition even if switch L closed at this time.

In order to facilitate a discussion of the control functions, let it be assumed that the governor switch N is so arranged in relation to the particular car and transmission illustrated, that this switch will open when the car is driven in first at about 7.5 m.p.h. (miles per hour). Obviously this may be varied as desired but, as a result of experience, it is believed to be an approximately desired condition. The governor switch N is preferably arranged to close, when its drive shaft 240 slows down from above the aforesaid critical speed of opening, at a corresponding car speed below the assumed 7.5 m.p.h. when in the second speed. The friction incident to the operation of the governor weights and their displacement will operate to provide the desired differential in the operation of switch N on car acceleration and stopping. If desired, any well known form of detent means may be employed to control the operation functions of the governor. The operation of the governor switch will, of course, vary with different gear ratios and in accordance with operating functions desired and as an example the governor switch may be arranged to open during car acceleration in first and third respectively at 7.5 and 15 m.p.h., the switch closing on stopping the car in direct and second respectively at speeds below 15 and 7 m.p.m.

The drive in first is a free-wheeling drive below 7.5 m.p.h. car speed because within such limits the governor switch N remains closed and solenoid K is thereby energized to maintain motor J vented, the driven shaft 93 being free to overrun the driving shaft 83 by automatic release of the overrunning clutch G.

When the car is driven above 7.5 m.p.h. in first, this being the normal operation of the car and being one reason for setting the critical speed of the governor switch N at the assumed relatively low car speed, the governor switch opens thereby deenergizing the solenoid K and upon release of the accelerator pedal to lower the pressure in manifold 54 and chamber 209a then sleeve F will shift to clutch with teeth 110, 110a when the sleeve is allowed to coast down to synchronize with the speed of gear 109 as aforesaid to step-up the drive from first to second.

While the car is being driven under the foregoing conditions above 7.5 m.p.h. in first, the shift from first to second is automatic and operates in response to driver release of the accelerator pedal 59 sufficiently to slow down the engine speed to the point where the blocker 184 will release the sleeve F. This is most conveniently accomplished by simply letting up on the accelerator pedal whereupon the speed of the engine quickly drops while the car maintains its speed by reason of overrun at clutch G. As the pinion 90 drops to the speed of gear 109, the sleeve F while urged rearwardly by spring 209 begins to fall behind the speed of the blocker 184 which is rotating at the speed of gear 109, and teeth 181a strike against the blocker teeth 186 to align the blocker teeth with the spaces between teeth 181, 181a whereupon the sleeve will shift rearwardly without shock or jar to clutch with the teeth 110, 110a during coast and thereby clutch the driving shaft 83 with gear 109 for the second speed drive faster than the aforesaid drive is first. The sleeve F, in the event that full clutching has not taken place on coast, will fully shift rearwardly to the Fig. 17 position at the instant that the driving shaft is next speeded up. Sleeve F therefore clutches during coast and under predetermined pressure of spring 209 which cushions the clutching and greatly increases the life of the clutch teeth. When sleeve F shifts rearwardly from the Fig. 21 position, switch L closes as plunger 225 rides out of recess 227 but the engine ignition is not interrupted because switch L' is then open, governor switch N having caused the breaking of the GC and LC circuits.

The drive in second passes from pinion 90 through sleeve F to gear 109 thence to gear 106, countershaft 97, gears 107 and 114, sleeve H, hub 120 and the driven shaft 93. This drive is a two-way drive, clutch G overrunning, and is maintained by the latch 228 which holds rail 199a and sleeve F rearwardly. The latch holds the mechanism from piston 204 to sleeve F from returning to the Fig. 21 position. The engine is used as a brake during coast in the second speed ratio, the car driving the engine at approximately twice the speed of the driven shaft 93 for the particular gear sizes illustrated.

Coasting or driving down in second below 7.5 m.p.h. causes the governor switch N to close and the sleeve F to declutch preparatory to starting the car in first. If the car is allowed to coast down in second, then when governor switch closes, the GC and LC circuits are closed to cause latch 228 to close switch L' and vent motor J so that spring 222 acts to declutch sleeve F almost instantaneously when governor switch N closes. The spring 222 is of such force that, under these conditions of very low engine coast torque on sleeve F, the spring will release the sleeve even though the engine ignition is momentarily interrupted incident to closing switch L'. As soon as the sleeve is released, the ignition is restored and the whole cycle occurs so rapidly that the engine does not stall. Of course, if the engine is driving the car in second at the time the governor switch N closes, as in going up a hill, then the ignition interruption is an advantage in the cycle in that the torque at the teeth of the sleeve F is momentarily relieved, as for the kickdown, thereby facilitating declutching of the sleeve.

Coasting or driving in direct down below the governor critical speed so as to cause the governor switch N to close will, in the same manner, release sleeve F and direct the transmission setting for a start in third. Of course, at kickdown the throttle is wide open and spring 222, while of sufficient power to declutch sleeve F under low coasting torque, would ordinarily not be strong enough to release the sleeve so that at such time the ignition interruption is desirable if not necessary as a practical matter. Of course, if the car coast in second does not go below the critical speed of governor switch N remains open and acceleration of the car will then take place in second without shifting back to low.

In shifting from second to the high range, the clutch C is released and the selector lever 165 moved rearwardly to the high range position to thereby cause manual shift sleeve H to move forwardly under blocker synchronizing shift to clutch with teeth 112 of gear 109 whereby this gear is directly drivingly connected with driven shaft 93 through sleeve H and hub 120. The driver then releases the clutch pedal 84 and depresses the accelerator pedal to drive the car in direct, skipping the third speed ratio because sleeve F remains engaged. The drive in third speed which may be selected for starting the car from rest, takes place from the main pinion 90 to gear 96 thence through the overrunning clutch G and through gears 106, 109 and directly out to the driven shaft 93.

The illustrated gears are of such sizes so that in accelerating the car in the third speed, the critical speed of the governor switch is roughly 15 m.p.h. car speed instead of 7.5 m.p.h. as in first and second. It is also noted that the governor drives at the same speed proportional to the driven shaft 93 in the first and second; also at the same speed proportional to the driven shaft speed in third and direct. Therefore the drive in the third speed below 15 m.p.h. is accompanied by free wheeling accommodated by the overrunning clutch G. Under these conditions the governor switch N remains closed to energize the GC and LC circuits thereby energizing the solenoid K and the sleeve F remains disengaged as in Fig. 21.

When starting the car in the high range and thus driving in the third speed above 15 m.p.h. the governor switch N opens to deenergize the solenoid and the direct speed ratio drive will automatically be obtained when the accelerator pedal is released for accommodating synchronous clutching of sleeve F. At the same time vacuum will be supplied to motor J and the sleeve operating mechanism will be latched by latch 228 entering groove 230. Once the parts are latched the sleeve F is not dependent on vacuum supply for its clutching. Under such conditions there is no free wheeling in the ordinary sense, the overrunning clutch G allowing the engine and shaft 83 to drop to the speed of gear 109 whereupon clutch F will engage teeth 110, 110a as before.

The shift from third to direct is therefore automatic and is obtained by releasing the accelerator pedal momentarily while driving the car above 15 m.p.h. At the synchronizing point, the blocker 184 will allow the sleeve F to clutch with teeth 110, 110a under the force of spring 209 as before. The direct drive is a two-way drive and passes from pinion 90 directly to gear 109 through sleeve F, thence directly to shaft 93 through sleeve H.

If desired, especially when using a fluid coupling at B, the car may be started from rest in third by releasing the main clutch C and shifting the selector lever 165 rearwardly to the high range. The solenoid K remains energized by governor switch N and on releasing the clutch pedal 84 and depressing the accelerator pedal 59, the blocker 184 will lag behind the sleeve F preventing its shift rearwardly when the car is accelerated in third above the speed at which the governor switch N opens, viz., above 15 m.p.h. Direct drive will then result from releasing the accelerator pedal to synchronize sleeve F with gear 90 as before.

The kickdown control functions to stepdown the driven from direct to third if the car speed is above 15 m.p.h. or from second to first if the car speed is above 7.5 m.p.h. depending on the setting of the manual shift sleeve H.

Assuming that the car is driving in direct above the critical speed of the governor switch N, viz., above 15 m.p.h. then the driver may obtain third by depressing the accelerator pedal 59 beyond the normal throttle opening range and through the kickdown range overtravelling the wide open throttle position. The kickdown switch 77 is thereby closed to close the KC circuit thereby causing operation of the LC circuit. This raises latch 228 and closes switch L' thereby energizing solenoid K and grounding the ignition to unload sleeve F. Motor J being vented, spring 222 shifts sleeve F forwardly and the ignition is restored, these parts being then positioned as in Fig. 21. The engine rapidly speeds up under open throttle condition to engage the overrunning clutch G and the car is then driven in the third speed. This whole cycle of kickdown takes place very rapidly and smoothly and is entirely responsive to the natural movement of the accelerator pedal downwardly into the kickdown range. The kickdown is conveniently used as a faster car accelerating drive for rapidly passing another car, in obtaining more favorable torque multiplication for hill climbing, etc. When the accelerator pedal is released, then the direct drive is automatically synchronously obtained. By preference, the direct drive is not restored after kickdown until the accelerator pedal is substantially fully released, as when finger 74 operates switch arm 76. This prevents undesired operations of the kickdown mechanism and changes in the speed ratio within a narrow range of accelerator pedal movement. Therefore this kickdown switch 77 when closed maintains the LC circuit closed and the solenoid K energized, and the solenoid is not deenergized until the accelerator is approximately fully released to open the KC and LC circuits to allow spring 231 to open switch L', this release also serving to instantly cause the vacuum to operate piston 204 forwardly.

When driving the car in the second speed ratio above 7.5 m.p.h., the accelerator pedal may be depressed to the kickdown range to effect release of the sleeve F and a drive in first as will be readily understood from the description of the kickdown from fourth to third. Likewise, the second speed is restored upon release of the accelerator pedal.

In order to drive the car in reverse, the driver releases the clutch C and shifts the selector lever from neutral upwardly and then rearwardly to mesh the reverse idler gear 117 with the gears 108 and 119. This reverse drive passes from pinion 90 to gear 96, then through overrunning clutch G and gears 108, 117, 119 to the driven shaft 93. The reverse drive is therefore a free wheeling drive and is illustrated as being of a ratio such that the governor switch N will open at about 6 m.p.h. to deenergize the solenoid K and effect synchronous clutching of sleeve F with teeth 110, 110a in response to release of the accelerator pedal. If the driver manipulates the reverse drive in this manner then a step-up in reverse is obtained without free wheeling. Such a drive passes through the following parts: pinion 90 through sleeve F to gear 109 thence to gear 106 and through the reverse gear set 108, 117, 119 to the driven shaft 93.

If desired, the car may be accelerated from standstill by depressing the accelerator pedal to the kickdown range and then releasing the pedal to automatically provide a step-up in the drive, the step-up being delayed until substantially full release of the accelerator pedal. Thus, with the engine idling, the driver may depress the clutch pedal 84 and select either the high or low range at selector lever 165 to shift sleeve H rearwardly or forwardly. The governor switch N maintains the solenoid K energized and motor J vented. Then the clutch pedal is released and the accelerator pedal depressed to its kickdown range. Although this closes the switch 77 the engine ignition is not grounded because the switch L is held open. As the car accelerates above the critical speed of the governor switch N, the governor switch opens but the solenoid K remains energized as the switch 77 is closed and will stay closed until approximate full release of the accelerator pedal. On such release of the accelerator pedal above the governor critical speed, the switch 77 is opened and the solenoid K is deenergized and pressure fluid acts at motor J to cause sleeve F to engage teeth 110, 110a under synchronizing control by the blocker 184.

In the modification in Fig. 22 I have illustrated a different form of clutch sleeve operator in that the spring 209, which affords a lost motion connection in Fig. 20, is now omitted and the rod 205' extends directly from piston 204 to the turnbuckle 201a and rod 201. This arrangement is less desirable than when employing the spring 209 to engage the sleeve F but the motor J operates by vacuum so rapidly upon release of the accelerator pedal that, if desired, this positive connection between piston 204 and sleeve F may be employed in the Fig. 21 system which, apart from the functions attendant to spring 209, operates identically to that aforesaid.

I claim:

1. In a motor vehicle drive having a rotatable driving shaft adapted to receive drive from the engine and a rotatable driven shaft adapted to transmit drive from the driving shaft for driving the vehicle; a first set of clutch teeth; manually operable clutch means operable at the will of the vehicle driver for drivingly connecting or disconnecting the first set of teeth with the driven shaft; reduction drive means, including an overrunning clutch interposed therein, operably drivingly connecting the driving shaft with the first set of teeth for driving these teeth from and at a speed slower than that of the driving shaft, said overrunning clutch automatically releasing the reduction drive in response to coast of the driving shaft; a second set of clutch teeth drivingly connected with the driving shaft; spring operating means for yieldingly urging shifting movement of one of said sets of teeth into positive clutching engagement with the other set when the speeds thereof are approximately synchronous; vacuum power means controlling operation of said spring operating means; means operating to releasably hold said vacuum power means in vacuum operated position independently of vacuum; and blocking control means cooperable with said shiftable teeth for blocking clutching shift thereof when the speeds of said sets of teeth are asynchronous.

2. In a motor vehicle drive having a rotatable driving shaft adapted to receive drive from the engine and a rotatable driven shaft adapted to transmit drive from the driving shaft for driving the vehicle; a first set of clutch teeth; clutch means operable for drivingly connecting or disconnecting the first set of teeth with the driven shaft; reduction drive means, including an overrunning clutch interposed therein, operably drivingly connecting the driving shaft with the first set of teeth for driving these teeth from and at a speed slower than that of the driving shaft, said overrunning clutch automatically releasing the reduction drive in response to coast of the driving shaft; a second set of clutch teeth drivingly connected with the driving shaft; spring operating means yieldingly urging shifting movement of one of said sets of teeth into positive clutching engagement with the other set when the speeds thereof are approximately synchronous; vacuum power means controlling operation of said spring operating means; electromagnetically controlled means for releasably holding said vacuum power means in one of its operating positions; and blocking control means cooperable with said shiftable teeth to block clutching shift thereof by said spring operating means when the driving shaft speeds up from coast to effect drive of the first set of teeth through said reduction drive means and to release said shiftable teeth for clutching shift thereof by said spring operating means when the driving shaft is allowed to coast down to a speed approximately synchronous with the first set of clutch teeth.

3. In a motor vehicle drive having a rotatable driving shaft adapted to receive drive from the engine and a rotatable driven shaft adapted to transmit drive from the driving shaft for driving the vehicle; low and high speed gears adapted for selective clutching with the driven shaft; clutch means operable for selectively clutching the low and high speed gears with the driven shaft; reduction drive means, including an overrunning clutch interposed therein, drivingly connecting the driving shaft with the low and high speed gears for driving these gears from and at a speed slower than that of the driving shaft, said overrunning clutch automatically releasing the reduction drive in response to coast of the driving shaft; a first set of clutch teeth carried by the high speed gear; a second set of clutch teeth drivingly connected with the driving shaft; spring operating means yieldingly urging shifting movement of one of said sets of clutch teeth into positive clutching engagement with the other set when the speeds thereof are approximately synchronous; vacuum power means controlling operation of said spring operating means; means operating to releasably hold said vacuum power means in vacuum operated position independently of vacuum; and blocking control means cooperable with said shiftable teeth to block shift thereof by said spring operating means when the driving shaft speeds up from coast to effect drive of the low and high speed gears through said reduction drive means and to release said shiftable teeth for clutching shift thereof by said spring operating means when the driving shaft is allowed to coast down to a speed approximately synchronous with the high speed gear.

4. In a motor vehicle drive having a rotatable driving structure adapted to receive drive from the engine and a rotatable driven structure adapted to transmit drive from the driving structure for driving the vehicle; relatively slow speed driving means, including an overrunning device operably associated therewith, for driving the driven structure from the driving structure; relatively fast speed driving means, including a shiftable drive-controlling member operably associated therewith, for driving the driven structure from the driving structure at a speed ratio faster than that provided by said slow driving means; said device automatically overrunning in response to coast of the driving structure to allow the driven structure to overrun the driving structure; means operably associated with said shiftable member for controlling shift thereof as a function of the relative speeds of said structures such that said shiftable member is prevented from shifting to establish operation of said fast driving means during operation of said slow driving means but is free to shift to establish operation of said fast driving means during said coast of the driving structure; a vacuum motor comprising a piston operable by vacuum to control shift of said shiftable member; motion transmitting means between said piston and said shiftable member so constructed and arranged that said piston may operate by vacuum prior to drive-establishing shift of said shiftable member as aforesaid; and means operating to releasably hold said piston in its vacuum operated position independently of vacuum.

5. In a power transmission for driving a vehicle having an engine, said engine having an intake system of the type providing a vacuum source; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a pressure differential operated motor adapted to utilize vacuum from said source for controlling shift of said clutch member; said motor comprising a vacuum operated piston; valving means for controlling application of vacuum from said source to said piston; electromagnetic means operably associated with said valving means and adapted to cause the valving means to vent and to apply vacuum as aforesaid to said piston; means urging release of said clutching member from its clutching position when said piston is vented; holding means for releasably holding said piston in its vacuum operated position independently of said vacuum; a plurality of control means for said electromagnetic means operable independently of one another, at least one of said electromagnetic control means being operable by the vehicle driver; and means operating in response to operation of each of said control devices for effecting release of said holding means and for controlling energization of said electromagnetic means.

6. In a power transmission for driving a vehicle having an engine; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a differential pressure fluid operated motor for controlling shift of said clutch member, said motor comprising a chamber and piston operably associated therewith; valving means for controlling application of differential fluid pressure to said piston and a balance of fluid pressures on said piston; electromagnetic means operably associated with said valving means and adapted to cause the valving means to effect said differential pressure and pressure balance aforesaid; means urging release of said clutching member from its clutching position when said piston is subjected to a pressure balance as aforesaid; holding means for releasably holding said piston in its differential pressure fluid operated position; means for effecting release of said holding means and for controlling energization of said electromagnetic means in response to rotation of one of said structures below a predetermined speed; and means operable by the vehicle driver for effecting release of said holding means and for controlling energization of said electromagnetic when the last said structure is rotating above said predetermined speed.

7. In a power transmission for driving a vehicle having an engine; change speed means operable to effect change in the transmission speed ratio; electromagnet controlled vacuum operating means for controlling operation of said change speed means to step-up the transmission drive from one speed ratio to another of relatively faster drive characteristic; holding means for releasably holding said vacuum operating means in vacuum operated position independently of vacuum; governor means; means for operating said governor means at a speed proportionate to the vehicle speed; circuit-controlling means operated by said governor means; electrical circuit-forming means controlled by said circuit-controlling means for controlling said holding means and for energizing said electromagnet; a switch; means operable by the vehicle driver for operating said switch; and electrical circuit-forming means controlled by said switch for controlling said holding means and for energizing said electromagnet.

8. In a motor vehicle power transmission having an engine; a driving structure adapted to receive drive from the engine, said engine having an intake system of the type providing a vacuum source; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure differential operated motor adapted to utilize vacuum from said source for controlling drive-establishing and drive-releasing movement of said movable drive control element, said motor comprising a piston operable by said vacuum from a first position to a second position thereof; a spring yieldingly urging said piston to its said first position; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by vacuum as aforesaid and so constructed and arranged as to accommodate vacuum operation of said piston in advance of drive-establishing movement of said movable drive control element; and releasable holding means adapted to releasably hold said piston in its said second position independently of said vacuum and adapted, when released, to accommodate movement of said piston to its said first position.

9. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a piston operable by vacuum from a first position to a second position thereof; a spring yieldingly urging said piston to its said first position; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by vacuum and so constructed and arranged as to accommodate vacuum operation of said piston in advance of drive-establishing movement of said movable drive control element; means operable to releasably hold said piston in its said second position independently of vacuum; valving means operable to control vacuum operation of said piston; and vehicle speed responsive means for controlling operation of said valving means and said holding means.

10. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by suction and so constructed and arranged as to accommodate suction operation of said piston in advance of drive-establishing movement of said movable drive control element; valving means for controlling suction application to and venting of said chamber; releasable holding means adapted to releasably hold said piston in its said second position and adapted, when released, to accommodate movement of said piston to its said first position; electro-magnetic means for controlling operation of said valving means and said holding means; and means operable under control of the vehicle driver for controlling operation of said electro-magnetic means.

11. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by suction and so constructed and arranged as to accommodate suction operation of said piston in advance of drive-establishing movement of said movable drive control element; valving means for controlling suction application to and venting of said chamber; releasable holding means adapted to releasably hold said piston in its said second position and adapted, when released, to accommodate movement of said piston to its said first position; electro-magnetic means for controlling operation of said valving means and said holding means; and vehicle speed responsive means for controlling operation of said electro-magnetic means.

12. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said chamber is vented; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by suction and so constructed and arranged as to accommodate suction operation of said piston in advance of drive-establishing movement of said movable drive control element; valving means for controlling suction application to and venting of said chamber; releasable holding means adapted to releasably hold said piston in its said second position and adapted, when released, to accommodate movement of said piston to its said first position; electro-magnetic means for controlling operation of said valving means and said holding means; vehicle speed responsive means for controlling operation of said electro-magnetic means; and means operable at the will of the driver for controlling operation of said electro-magnetic means.

13. In a motor vehicle power transmission having an engine; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a fluid motor operable to control drive-establishing and drive-releasing movement of said movable element, said motor comprising a reciprocatory piston adapted for pressure fluid movement from a first position to a second position and a spring biasing said piston to its said first position; valving means operable to control application of differential fluid pressure to said piston and a balance of fluid pressures on said piston; electromagnetic means for operating said valving means; electromagnetic means operable to releasably hold said piston in its said second position independently of said differential pressure fluid acting thereon; and vehicle speed responsive means for controlling energization of each of said electromagnetic means such that, in response to bringing the vehicle to rest from a condition of drive between said structures as aforesaid, said motor is operated to effect a balance of fluid pressures on said piston and said piston is released with respect to said holding means.

14. In a motor vehicle power transmission according to claim 13; and means operable under control of the vehicle driver for controlling energization of each of said electromagnetic means independently of said energization control by said vehicle speed responsive means such that, when the vehicle is being driven in a condition of drive between said structures as aforesaid, said motor is operated to effect a balance of fluid pressures on said piston and said piston is released with respect to said holding means.

15. In a motor vehicle power transmission having an engine, said engine having an intake system of the type providing a vacuum source; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a vacuum motor connected to said vacuum source and operable to control drive-establishing and drive-releasing movement of said movable element, said motor comprising a piston adapted for vacuum operation from a first position to a second position and a spring biasing return of said piston to said first position; valving means operable to control communication between the engine intake system and said piston; electromagnetic means for operating said valving means; electromagnetic means operable to releasably hold said piston in its said vacuum operated position independently of said vacuum; and vehicle speed responsive means for controlling energization of each of said electromagnetic means such that, in response to bringing the vehicle to rest from a condition of drive between said structures as aforesaid, said motor is vented and said piston is released with respect to said holding means.

16. In a motor vehicle power transmission having an engine, said engine having an intake system of the type providing a vacuum source; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a vacuum motor connected to said vacuum source and operable to control drive-establishing and drive-releasing movement of said movable element, said motor comprising a piston adapted for vacuum operation from a first position to a second position and a spring biasing return of said piston to said first position; valving means operable to control communication between the engine intake system and said piston; electromagnetic means for operating said valving means; electromagnetic means operable to releasably hold said piston in its said vacuum operated position independently of said vacuum; and means operable under control of the vehicle driver for controlling energization of each of said electromagnetic means.

17. In a power transmission for driving a vehicle having an engine; a rotatable driving structure adapted to receive drive for the engine; a rotatable driven structure adapted to transmit drive from the driving structure for driving the vehicle; a drive-controlling member drivingly connected with one of said structures and shiftable to positively engage the other of said structures to establish a driving relationship between said structures; a fluid operated motor for controlling shift of said member, said motor comprising a chamber and piston operably associated therewith; valving means for controlling application of differential fluid pressure and of a pressure balance to said piston; electromagnetic means operably associated with said valving means for controlling the same; means urging release of said member from its clutching position when said piston is subjected to pressure balance of the fluid acting thereon; holding means for releasably holding said piston in its differential pressure fluid operated position; means for effecting release of said holding means and for controlling energization of said electromagnetic means in response to rotation of one of said structures below a predetermined speed; and means operable by the vehicle driver for effecting release of said holding means and for controlling energization of said electromagnetic means when the last said structure is rotating above said predetermined speed.

18. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a piston operable by vacuum from a first position to a second position thereof; a spring yieldingly urging said piston to its said first position; lost-motion piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by vacuum and so constructed and arranged, in cooperative association with said lost-motion piston operated means, as to accommodate vacuum operation of said piston in advance of drive-establishing movement of said movable drive control element; means operable to releasably hold said piston in its said second position independently of vacuum; valving means operable to control vacuum operation of said piston; and vehicle speed responsive means for controlling operation of said valving means and said holding means.

19. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element; said motor comprising a suction chamber and a piston operable therein by suction from a first position to a second position thereof; a spring acting to move said piston to its said first position when said chamber is vented; lost-motion piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by suction and so constructed and arranged, in cooperative association with said lost-motion piston operated means, as to accommodate suction operation of said piston in advance of drive-establishing movement of said movable drive control element; valving means for controlling suction application to and venting of said chamber; releasable holding means adapted to releasably hold said piston in its second position and adapted, when released to accommodate movement of said piston to its said first position; electro-magnetic means for controlling operation of said valving means and said holding means; and means operable under control of the vehicle driver for controlling operation of said electro-magnetic means.

20. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said chamber is vented; lost-motion piston operated means for transmitting movement from said piston to said movable drive control element and adapted for movement from a first position to a second positon for imparting drive-releasing movement to said movable drive control element; yielding means operating to urge drive-establishing movement of said movable drive control element when said piston is operated by suction and so constructed and arranged, in cooperative association with said lost-motion piston operated means, as to accommodate suction operation of said piston in advance of drive-establishing movement of said movable drive control element; valving means for controlling suction application to and venting of said chamber; releasable holding means adapted to releasably hold said piston in its said second position and adapted, when released, to accommodate movement of said piston to its said first position; electro-magnetic means for controlling operation of said valving means and said holding means; and vehicle speed responsive means for controlling operation of said electro-magnetic means.

21. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a suction chamber and a piston operable therein by suction from a first position to a second position thereof; a spring acting to move said piston to its said first position when said piston is subjected to pressure balance; lost-motion piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by suction and so constructed and arranged, in cooperative association with said lost-motion piston operated means, as to accommodate suction operation of said piston in advance of drive-establishing movement of said movable drive control element; valving means for controlling suction application to and pressure balance application to said piston; releasable holding means adapted to releasably hold said piston operated means in its said first position and adapted, when released to accommodate movement of said piston operated means to its said second position; electro-magnetic means for controlling operation of said valving means and said holding means; vehicle speed responsive means for controlling operation of said electro-magnetic means; and means operable at the will of the driver for controlling operation of said electro-magnetic means.

22. In a motor vehicle provided with an internal combustion engine having an intake system, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing and operably connected to a torque transmitting element of the transmission, a control valve for controlling application of differential pressure to the power element by utilizing the vacuum of said intake system, a solenoid for operating said valve, an ignition controlling switch operably associated with the power element, switch operating force transmitting means connected with the power element, and electrical means cooperating with said switch to provide a means for cutting the ignition system into or out of operation and for controlling the operation of the solenoid, said electrical means including an accelerator operated switch and a governor operated switch, the parts of the power means being so constructed and arranged and so operative as to effect, after the accelerator is depressed sufficiently to close the switch operated thereby or after the governor operated switch is closed, a movement of the power element in one direction to move said torque transmitting element to thereby uncouple said element from another torque transmitting element of the transmission and at the same time render the electrical means, including the ignition controlling switch, operable to cut the ignition system out of operation and thereby facilitate said uncoupling operation.

23. In a motor vehicle provided with an internal combustion engine having an intake system, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing and operably connected to a torque transmitting element of the transmission, a control valve for controlling application of differential pressure to the power element by utilizing the vacuum of said intake system, a solenoid for operating said valve, an ignition controlling switch operably associated with and adapted to be controlled by the power element, switch operating force transmitting means connected with the power element, and electrical means co-operating with said switch to provide a means for cutting the ignition system into or out of operation and for controlling the operation of the solenoid, said electrical means including an accelerator operated switch and a governor operated switch, the parts of the power means being so constructed and arranged and so operative as to effect, after the accelerator is depressed sufficiently to close the switch operated thereby or after the governor operated switch is closed, a movement of the power element in one direction to move said torque transmitting element to thereby uncouple said element from another torque transmitting element of the transmission, and at the same time render the electrical means, including the ignition controlling switch, operable to momentarily cut the ignition system out of operation and thereby facilitate said uncoupling operation.

24. In a motor vehicle provided with an internal combustion engine having an intake system, an accelerator, an engine controlling ignition system, and a change-speed transmission, power means for operating the transmission and in part controlling the operation of the ignition system to facilitate a certain operation of the transmission, said power means including a motor casing, a pressure differential and spring operated power element housed within said motor casing and operably connected to a torque transmitting element of the transmission, a control valve for controlling application of differential pressure to the power element by utilizing the vacuum of said intake system, a solenoid for operating said valve, an ignition controlling switch adapted to be opened as an incident to movement of the power element in one direction thereby to restore the ignition system to operation, switch operating force transmitting means connected with the power element, and electrical means cooperating with said switch to provide a means for cutting the ignition system into or out of operation when said switch is open or closed respectively and for controlling the operation of the solenoid, said electrical means including an accelerator operated switch and a governor operated switch, the parts of the power means being so constructed and arranged and so operative as to effect, after the accelerator is depressed sufficiently to close the switch operated thereby or after the governor operated switch is closed, a movement of the power element in said one direction to move said torque transmitting element to thereby uncouple said element from another torque transmitting element of the transmission, and at the same time render the electrical means, including the ignition controlling switch, operable to momentarily cut the ignition system out of operation and thereby facilitate said uncoupling operation.

25. In a motor vehicle having an internal-combustion engine and a change-speed transmission, power means, having a power element, means operable by said power element providing a lost motion connection between said power element and said transmission, said power element so operating the transmission as to alternately effect a relatively high speed ratio between the engine and drive wheels of the vehicle and a relatively low speed ratio between the engine and drive wheels, said power means including a pressure differential and spring operated motor energized by a spring within the motor to effect said low speed ratio setting of the transmission by said power element and by a differential of gaseous pressures within the motor to effect said high speed ratio setting of the transmission by said power element, and means for controlling the operation of said motor including the accelerator of the vehicle said power element operable means being so constructed and arranged as to be operable first to effect a taking up of slack in the connections between the aforementioned power element and the transmission during said low speed operation of said power element and then to effect said low speed ratio setting of the transmission, said operation being effected after the accelerator is fully depressed.

26. In an automotive vehicle provided with an engine controlling ignition system, an accelerator and a change-speed transmission including a speed ratio controlling torque transmitting element, ignition controlling means including a plurality of switches for cutting the ignition system into and out of operation, and an accelerator controlled power means for operating the transmission and in part controlling the operation of said ignition controlling means by operating one of the aforementioned switches, said power means including a spring and pressure differential operated motor unit, a power element operable by said motor unit and means operable by said power element providing a lost motion connection between said power element and said torque transmitting element, said unit being operably connected with the latter switch by said power element operated means and being operative to take up slack in the lost motion connection between said torque transmitting element of the transmission and said power element of the power means before the ignition system is cut out of operation.

27. In an automotive vehicle provided with an ignition system and a speed ratio changing transmission for varying the driving ratio between the engine and the driving wheels, means for temporarily disabling the ignition system to facilitate a certain power operation of the transmission, said means including a switch, and power means for operating said transmission and in part controlling the operation of said ignition disabling means, said power means including a motor including a power element, and a switch operating means operably connected to the power element of said motor, said switch operating means being operative in response to operation of the power element for establishing the transmission in one of its gear ratio settings to close said switch for disabling said ignition and then keep said switch closed for only a limited time.

28. In a motor vehicle provided with an internal combustion engine, an accelerator, an engine controlling ignition system and a change-speed transmission, power means for operating the transmission and in part controlling the operation of the ignition system to facilitate a certain operation of the transmission, said power means including a motor casing, a pressure differential and spring operated power element housed within said motor casing, means operably connecting said power element to a torque transmitting element of the transmission, a control valve for said power means, a solenoid for operating said valve, an ignition interrupter switch, said connecting means including switch operating force transmitting means, and electrical means cooperating with said switch to provide a means for cutting the ignition system into or out of operation and for controlling the operation of the solenoid, said electrical means including an accelerator operated switch and a governor operated switch, the said connecting means being so constructed and arranged and so operative as to effect, after the accelerator is depressed sufficiently to close the switch operated thereby or after the governor operated switch is closed, a movement of the power element in one direction to effect an operation of said connecting means to move said torque transmitting element to thereby uncouple said element from another torque transmitting element of the transmission and said electrical means when so conditioned being operable to render the electrical means, including the ignition interrupter switch, operable to cut the ignition system out of operation and thereby facilitate said uncoupling operation, said switch operating force transmitting means being also operable to effect a cut-in operation of the ignition system upon completion of said uncoupling operation of the transmission.

29. In a motor vehicle provided with an internal combustion engine, an accelerator, an engine controlling ignition system, and a change-speed transmission, electrical means for cutting the ignition system into or out of operation, power means including a pressure differential and spring operated motor and means operable by said power means including a rod for operating the transmission and in part controlling the operation of said electrical means, said electrical means including an ignition interrupter switch operable by said rod, valve means for controlling the operation of said power means, and means including an accelerator operated switch and a governor operated switch for controlling said valve means, the said switch operating rod being so shaped and the remainder of the parts of said power operable means being so constructed and arranged as to effect, a relatively short time after the accelerator is depressed sufficiently to operate the switch operated thereby, an ignition cut-out operation of said electrical means and at the same time an operation of the power means to effect a speed ratio change operation of the transmission and then effect an ignition cut-in operation of said electrical means by said rod and furthermore to effect, when the governor operated switch is operated and the accelerator is sufficiently released to open the switch operated thereby, another speed ratio change operation of the change-speed transmission by said power means.

30. In an automotive vehicle provided with a power transmission system including an internal combustion engine having a throttle, an ignition system for in part controlling the operation of said engine, a change-speed transmission, a transmission operating crank, a vehicle speed responsive governor and a fluid clutch, said fluid clutch constituting a part of means coupling said engine and transmission and operative to facilitate a power operation of the transmission, power means, including a motor unit controlled by said governor and operably connected with the crank so as to have a lost motion connection therewith, said power means being adapted, for operating the transmission and including means in part controlling the operation of the ignition system, and a spring returned manually operated means for so opening and closing the throttle and controlling the operation of the fluid clutch and said power means as to successively effect, when said manually operated means is moved to its limit in one direction, an opening of the engine throttle, a slack take-up operation of the means inter-connecting the power element of the motor unit and the crank, a disabling of the ignition system and a concurrent demeshing operation of the change-speed transmission and lastly a resumption of operation of the ignition system just prior to the completion of the movement of the crank and to thereafter successively effect, when the speed of the vehicle reaches a predetermined factor and upon releasing the manually operated means to return the same to throttle closing position, a closing movement of the engine throttle and another operation of the crank.

31. In an automotive vehicle provided with an accelerator, a vehicle speed responsive governor, a change speed transmission and an ignition system, power means for operating said transmission and in part controlling the operation of the ignition system, said power means including a pressure differential and spring operated motor, a valve for controlling the operation of said motor, a solenoid for actuating said valve, an ignition controlling breaker switch operated by said motor, and electrical means for controlling the operation of said solenoid and breaker switch, including a breaker switch controlling switch means controlled by an operation of the accelerator and governor and further including other switch means, also controlled by an operation of the accelerator and governor, for controlling the operation of the valve actuating solenoid, said aforementioned mechanism being so constructed and so interconnected as to effect a pressure differential operation of said motor when the accelerator is fully released and the vehicle is travelling at or above a certain speed and also to effect a spring operation of said motor, with a consequent operation of the breaker switch, when either the accelerator is depressed to or beyond a certain position in its throw or the speed of the vehicle is reduced to or below a certain value.

32. In a motor vehicle power transmission having an engine; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a differential pressure fluid motor operable to control drive-establishing and drive-releasing movement of said movable element, said motor comprising a reciprocator differential pressure fluid operated member adapted to be energized for differential pressure fluid movement from a first position to a second position and a spring biasing said differential pressure fluid operated member to its said first position upon deenergization of said motor; valving means operable to control application of differential pressure fluid to said differential pressure fluid operated member; electromagnetic means for operating said valving means; electromagnetic means operable to releasably hold said differential pressure fluid operated member in its said second position independently of said differential pressure fluid; and vehicle speed responsive means for controlling energization of each of said electromagnetic means such that, in response to bringing the vehicle to rest from a condition of drive between said structures as aforesaid, said motor is deenergized and said differential pressure fluid operated member is released with respect to said holding means.

33. In a motor vehicle power transmission having an engine; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a differential pressure fluid motor operable to control drive-establishing and drive-releasing movement of said movable element, said motor comprising a reciprocatory differential pressure fluid operated member adapted to be energized for differential pressure fluid movement from a first position to a second position and a spring biasing said differential pressure fluid operated member to its said first position upon deenergization of said motor; valving means operable to control application of differential pressure fluid to said differential pressure fluid operated member; electromagnetic means for operating said valving means; electromagnetic means operable to releasably hold said differential pressure fluid operated member in its said second position independently of said differential pressure fluid; vehicle speed responsive means for controlling energization of each of said electromagnetic means such that, in response to bringing the vehicle to rest from a condition of drive between said structures as aforesaid, said motor is deenergized and said differential pressure fluid operated member is released with respect to said holding means; and means operable under control of the vehicle driver for controlling energization of each of said electromagnetic means independently of said energization control by said vehicle speed responsive means such that, when the vehicle is being driven in a condition to drive between said structures as aforesaid, said motor is deenergized and said differential pressure fluid operated member is released with respect to said holding means.

34. In a motor vehicle power transmission having an engine, said engine having an intake system of the type providing a vacuum source; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a vacuum motor, conduit means connecting said motor to said vacuum source and operable to control drive-establishing and drive-releasing movement of said movable element, said motor comprising a pressure fluid operated member adapted for vacuum operation from a first position to a second position and a spring biasing return of said pressure fluid operated member to said first position; valving means operable to control communication between the engine intake system and said vacuum motor; electromagnetic means for operating said valving means; electromagnetic means operable to releasably hold said pressure fluid operated member in its said vacuum operated position independently of said vacuum; and vehicle speed responsive means for controlling energization of each of said electromagnetic means such that, in response to bringing the vehicle to rest from a condition of drive between said structures as aforesaid, said motor is vented and said pressure fluid operated member is released with respect to said holding means.

35. In a motor vehicle power transmission having an engine, said engine having an intake system of the type providing a vacuum source; a driving structure adapted to receive drive from the engine; a driven structure adapted to receive drive from the driving structure for driving the vehicle; means operable to provide a drive between the driving and driven structures and including engageable drive-controlling elements one of which is movable relative to the other to establish and release said drive; a vacuum motor, conduit means connecting said motor to said vacuum source and operable to control drive-establishing and drive-releasing movement of said movable element, said motor comprising a pressure fluid operated member adapted for vacuum operation from a first position to a second position and a spring biasing return of said pressure fluid operated member to said first position; valving means operable to control communication between the engine intake system and said vacuum motor; electromagnetic means for operating said valving means; electromagnetic means operable to releasably hold said pressure fluid operated member in its said vacuum operated position independently of said vacuum; and means operable under control of the vehicle driver for controlling energization of each of said electromagnetic means.

36. In an automotive vehicle provided with a change speed transmission and an ignition system, power means for operating said transmission including a pressure differential and spring operated motor, said motor having a power element, adapted for pressure differential and spring operation, and a spring for operating said power element, a switch operating rod operably connected to said power element, a switch adapted to be actuated by said switch operating rod for control of said ignition system, a three-way valve mechanism for controlling operation of said motor, a solenoid, means including said solenoid for so controlling operation of said valve mechanism as to effect pressure differential and spring operations of said motor thereby to effect movement of the power element between two operative positions thereof, a second solenoid, and means including said second solenoid operating either to releasably hold said power element in that one of its said operative positions to which it is moved by pressure differential operation of said motor, or to release said power element for operation thereof by said spring to the other of its said operative positions.

37. In a power transmission for driving a vehicle having an engine; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a fluid operated motor for controlling shift of said clutch member, said motor comprising a chamber and fluid pressure operable element operably associated therewith; valving means for controlling application of differential fluid pressures to said element and a balance of fluid pressures on said element; solenoid means for operating said valving means; means urging release of said clutching member from its clutching position when said element is subjected to a pressure balance as aforesaid; holding means for releasably holding said element in its differential pressure operated position; means for effecting release of said holding means and for controlling energization of said solenoid means in response to rotation of one of said structures below a predetermined speed; and means operable by the vehicle driver for effecting release of said holding means and for controlling energization of said solenoid means when the last said structure is rotating above said predetermined speed.

38. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a suction chamber and a member operable therein by suction from a first position to a second position thereof; a spring acting to move said member to its said first position when said chamber is vented; means operated by said member for transmitting movement from said member to said movable drive control element and adapted for movement from a first position to a second position for imparting drive-releasing movement to said movable drive control element; yielding means operating to urge drive-establishing movement of said movable drive control element when said member is operated by suction and so constructed and arranged as to accommodate suction operation of said member in advance of drive-establishing movement of said movable drive control element; valving means for controlling suction application to and venting of said chamber; releasable holding means adapted to prevent movement of said member from its said second position to its said first position and adapted, when released, to accommodate movement of said member to its said first position; solenoid means for controlling operation of said valving means and said holding means; vehicle speed responsive means for controlling operation of said solenoid means; and means operable at the will of the driver for controlling operation of said solenoid means.

39. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a vacuum motor operable to control drive-establishing and drive-releasing movement of said movable drive control element, said motor comprising a member operable by vacuum from a first position to a second position thereof; a spring yieldingly urging said member to its said first position; lost-motion means operated by said member for transmitting movement from said member to said movable drive control element and adapted for movement from a first position to a second position for imparting drive-releasing movement to said movable drive control element; yielding means operating to urge drive-establishing movement of said movable drive control element when said member is operated by vacuum and so constructed and arranged, in cooperative association with said lost-motion member operated means, as to accommodate vacuum operation of said member in advance of drive-establishing movement of said movable drive control element; holding means operable independently of vacuum to releasably prevent-movement of said member from its said second position to its said first position; valving means operable to control vacuum operation of said member; and vehicle speed responsive means for controlling operation of said valving means and said holding means.

40. In an automotive vehicle provided with an internal combustion engine, an ignition system constituting part of the means for controlling the operation of said engine, a change-speed transmission mechanism, a crank for operating said transmission mechanism, a vehicle speed responsive governor and an accelerator, power means operative to move said crank in one or the other of two directions and to momentarily disable the ignition system to facilitate the operation of the power means in establishing the transmission in one of said settings, said power means comprising a motor including a casing, a spring and pressure differential operated power element housed within said casing and, together with the casing, outlining two compartments, and a spring housed within one of the compartments of said casing, said spring serving when expanding to move the power element in one direction, a power element operated ignition interrupter switch electrically connected to the ignition system, said switch being housed within a casing associated with the motor casing, force transmitting means connected to said power element, said means being operative, when the power element is moved by the aforementioned spring, to uncouple a torque transmitting element of the transmission from another torque transmitting element of the transmission, an air transmitting conduit interconnecting one of the aforementioned motor compartments with the intake manifold of the engine, a three-way valve for controlling the gaseous pressure within one of the compartments of the motor, the other of said compartments being permanently vented to the atmosphere, a solenoid and a spring for operating said valve, electrical means for controlling the operation of said solenoid, said means including a grounded accelerator operated switch connected by electrical means to the solenoid and a grounded governor operated switch connected by electrical means to the solenoid, force transmitting means connected to the power element and operated, when the power element is moved, to actuate the ignition interrupter switch, the parts of the aforementioned power means being so constructed and arranged that when the governor operated switch and the accelerator operated switch are opened and the accelerator is released sufficiently to make possible an evacuation of the intake manifold, then the valve is operated and the motor is then energized by vacuum to move the transmission operating crank in one direction and when either the governor operated switch or the accelerator operated switch is closed there results an energization of the motor by an expansion of the spring within the same to move the transmission operating crank in another direction and to operate the ignition interrupter switch.

41. In an automotive vehicle provided with an internal combustion engine, an ignition system constituting part of the means for controlling the operation of said engine, a change-speed transmission mechanism, a crank for operating said transmission mechanism, a vehicle speed responsive governor and an accelerator, power means operative to move said crank in one or the other of two directions and to momentarily disable the ignition system to facilitate the operation of the power means in establishing the transmission in one of said settings, said power means comprising a motor including a casing, a spring and pressure differential operated power element housed within said casing and, together with the casing, outlining two compartments, and a spring housed within one of the compartments of said casing, said spring serving when expanding to move the power element in one direction, a power element operated ignition interrupter switch electrically connected to the ignition system, said switch being housed within a casing associated with the motor casing, force transmitting means operably connected with said power element, said means being operative, when the power element is moved by the aforementioned spring, to uncouple a torque transmitting element of the transmission from another torque transmitting element of the transmission, an air transmitting conduit interconnecting one of the aforementioned motor compartments with the intake manifold of the engine, a three-way valve for controlling the gaseous pressure within one of the compartments of the motor, the other of said compartments being permanently vented to the atmosphere, a solenoid and a spring for operating said valve, electrical means for controlling the operation of said solenoid, said means including a grounded accelerator operated switch connected by electrical means to the solenoid and a grounded governor operated switch connected by electrical means to the solenoid, force transmitting means operably connected with the power element and operated, when the power element is moved, to actuate the ignition interrupter switch, the parts of the aforementioned power means being so constructed and arranged that when the governor operated switch and the accelerator operated switch are opened and the accelerator is released sufficiently to make possible an evacuation of the intake manifold, then the valve is operated and the motor is then energized by vacuum to move the transmission operating crank in one direction and when either the governor operated switch or the accelerator operated switch is closed there results an energization of the motor by an expansion of the spring within the same to move the transmission operating crank in another direction and to operate the ignition interrupter switch.

References Cited in the file of this patent

UNITED STATES PATENTS

| Number | Name | Date |
|---|---|---|
| Re. 21,844 | Vetter | June 24, 1941 |
| 1,360,035 | Shepherd | Nov. 23, 1920 |
| 1,544,909 | Josephs et al. | July 7, 1925 |
| 1,886,003 | Garrison | Nov. 1, 1932 |
| 1,911,599 | Bloxsom | May 30, 1933 |
| 1,992,957 | Maedel | Mar. 5, 1935 |
| 1,993,544 | Fleischel | Mar. 5, 1935 |
| 2,035,678 | Swift | Mar. 31, 1936 |
| 2,121,157 | Lempereur et al. | June 21, 1938 |
| 2,141,096 | Thurber | Dec. 20, 1938 |
| 2,156,209 | Thurber | Apr. 25, 1939 |
| 2,159,846 | Gambardella | May 23, 1939 |
| 2,160,385 | Kraemer et al. | May 30, 1939 |
| 2,117,428 | Fleischel | Oct. 24, 1939 |
| 2,190,256 | Cheek et al. | Feb. 13, 1940 |
| 2,199,095 | Banker | Apr. 30, 1940 |
| 2,214,099 | Claytor | Sept. 10, 1940 |
| 2,214,100 | Claytor | Sept. 10, 1940 |
| 2,218,136 | Price | Oct. 15, 1940 |
| 2,250,656 | Schjolin | July 29, 1941 |
| 2,254,334 | Vincent | Sept. 2, 1941 |
| 2,255,020 | Barnes | Sept. 2, 1941 |
| 2,257,838 | Claytor | Oct. 17, 1941 |

FOREIGN PATENTS

| 709,982 | France | May 26, 1931 |